United States Patent
Sakamoto et al.

(10) Patent No.: US 12,413,256 B2
(45) Date of Patent: Sep. 9, 2025

(54) WIRELESS COMMUNICATION SYSTEM, RELAY APPARATUS AND WIRELESS COMMUNICATION METHOD

(71) Applicant: NIPPON TELEGRAPH AND TELEPHONE CORPORATION, Tokyo (JP)

(72) Inventors: Kazumitsu Sakamoto, Musashino (JP); Yosuke Fujino, Musashino (JP); Daisuke Goto, Musashino (JP); Yasuyoshi Kojima, Musashino (JP); Kiyohiko Itokawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 5 days.

(21) Appl. No.: 18/036,304

(22) PCT Filed: Dec. 23, 2020

(86) PCT No.: PCT/JP2020/048233
§ 371 (c)(1),
(2) Date: May 10, 2023

(87) PCT Pub. No.: WO2022/137396
PCT Pub. Date: Jun. 30, 2022

(65) Prior Publication Data
US 2023/0412199 A1 Dec. 21, 2023

(51) Int. Cl.
*H04B 1/04* (2006.01)
*H04B 1/00* (2006.01)
*H04B 7/185* (2006.01)

(52) U.S. Cl.
CPC .......... *H04B 1/0458* (2013.01); *H04B 1/006* (2013.01); *H04B 7/185* (2013.01)

(58) Field of Classification Search
CPC ........ H04B 1/109; H04B 1/10; H04B 17/345; H04B 1/12; H04B 1/1027; H04B 1/0458; H04B 1/006; H04B 7/185; H04L 27/14
See application file for complete search history.

(56) References Cited

U.S. PATENT DOCUMENTS 7,873,002 B2 * 1/2011 Cai .................. H04W 72/1263
455/13.1
7,962,104 B1 * 6/2011 Wilz ..................... H04B 1/109
455/132

(Continued)

FOREIGN PATENT DOCUMENTS

JP 2004260555 A * 9/2004

OTHER PUBLICATIONS

Wei Feng, et al. "UAV-aided MIMO communications for 5G Internet of Things", IEEE Internet of Things Journal, vol. 6, Issue 2, 2018, p. 1731-1740.

(Continued)

*Primary Examiner* — Sophia Vlahos
(74) *Attorney, Agent, or Firm* — Harness, Dickey & Pierce, P.L.C.

(57) ABSTRACT

A wireless communication system includes: a measurement unit that measures a signal level of an analog signal corresponding to a received radio signal; a first output unit that amplifies an amplitude of the analog signal and extracts an analog signal with a desired frequency band from the analog signal with the amplified amplitude; a second output unit that extracts an analog signal with a desired frequency band from the analog signal and amplifies an amplitude of the extracted analog signal; and a switching control unit that inputs the analog signal corresponding to the received radio signal to the first output unit when the signal level of the analog signal other than the desired frequency band is less than a threshold, and inputs the analog signal corresponding (Continued)

to the received radio signal to the second output unit when the signal level of the analog signal other than the desired frequency band is equal to or greater than the threshold.

3 Claims, 17 Drawing Sheets

(56) References Cited

U.S. PATENT DOCUMENTS

| | | | |
|---|---|---|---|
| 9,729,212 B1* | 8/2017 | Tota | H04B 7/0404 |
| 10,103,772 B2* | 10/2018 | Pehlke | H03F 3/72 |
| 2004/0018824 A1* | 1/2004 | Fang | H04B 1/109 |
| | | | 455/313 |
| 2014/0269455 A1* | 9/2014 | Kim, II | H04W 48/12 |
| | | | 370/280 |

OTHER PUBLICATIONS

S. Dragas, et al., "Multi Satellite Tracking Antenna for Navigation Systems," 29th ESA Antenna Workshop on Multiple Beam and Reconfigurable Antennas—Innovation and challenges, Apr. 2007.

* cited by examiner

WIRELESS COMMUNICATION SYSTEM, RELAY APPARATUS AND WIRELESS COMMUNICATION METHOD

CROSS-REFERENCE TO RELATED APPLICATIONS

This application is a 371 U.S. National Phase of International Application No. PCT/JP2020/048233, filed on Dec. 23, 2020. The entire disclosure of the above application is incorporated herein by reference.

TECHNICAL FIELD

The present invention relates to a wireless communication system, a relay apparatus, and a wireless communication method.

BACKGROUND ART

With development of Internet of Things (IoT) technologies, installing IoT terminals including various sensors in various places has been studied. For example, it is also assumed that IoT is utilized to collect data of places where it is difficult to install base stations, such as buoys and ships on the sea and mountainous areas. Meanwhile, there is a technology in which an unmanned aerial vehicle (UAV), a stationary satellite, or the like wirelessly communicates with a communication device on the ground (see Non Patent Document 1).

In order to inhibit a decrease in reception sensitivity of a weak radio signal transmitted from a communication device on the ground, it is effective to provide a low noise amplifier immediately after a reception antenna to inhibit an increase in noise figure (NF) in a low noise amplifier (LNA) (see Non Patent Document 2).

CITATION LIST

Non Patent Documents

Non Patent Document 1: Wei Feng, et al. "UAV-aided MIMO communications for 5G Internet of Things", IEEE Internet of Things Journal, Volume6, Issue2, 2018, p. 1731-1740

Non Patent Document 2: S. Dragas, P. Jankovic, L. Gonzalez, Z. Golubicic, L. S. Drioli, "Multi Satellite Tracking Antenna for Navigation Systems", 29th ESA Antenna Workshop on Multiple Beam and Reconfigurable Antennas—Innovation and challenges, April 2007.

SUMMARY OF INVENTION

Technical Problem

However, for example, radio signals other than desired frequency bands (unnecessary waves) at high signal levels interfere with weak radio signals in the desired frequency bands (desired waves) transmitted from IoT terminals to relay devices mounted on low earth orbiting satellites in some cases. Such unnecessary waves are, for example, radio signals arriving at the relay devices from base stations of other satellite communication systems, radio signals simultaneously arriving at relay devices from many terminals and the like of cellular systems, radio signals arriving at relay devices from airplanes flying at high altitudes, or radio signals arriving at relay devices from other short-range artificial satellites in inter-satellite communication. When unnecessary waves interfere with weak radio signals in desired frequency bands, deterioration in reception sensitivity of radio signals may not be inhibited.

In view of the foregoing circumstances, an objective of the present invention is to provide a wireless communication system, a relay device, and a wireless communication method capable of inhibiting deterioration in reception sensitivity of a radio signal.

Solution to Problem

An aspect of the present invention is a wireless communication system that includes: a first communication device; a second communication device; a mobile relay device; an antenna configured to receive a first radio signal with a predetermined band including a desired frequency band associated with the first communication device; a measurement unit configured to measure a signal level of an analog signal corresponding to the received first radio signal in the predetermined band; a first output unit configured to amplify an amplitude of the input analog signal and extract the analog signal with the desired frequency band from the analog signal with the amplified amplitude when the analog signal corresponding to the received first radio signal is input; a second output unit configured to extract the analog signal with the desired frequency band from the input analog signal and amplify the amplitude of the extracted analog signal when the analog signal corresponding to the received first radio signal is input; a switching control unit configured to input the analog signal corresponding to the received first radio signal to the first output unit when a signal level of the analog signal other than the desired frequency band in the predetermined band is less than a threshold, and to input the analog signal corresponding to the received first radio signal to the second output unit when the signal level of the analog signal other than the desired frequency band in the predetermined band is equal to or greater than the threshold; and a transmission unit configured to transmit a second radio signal corresponding to the analog signal extracted by the first output unit or a third radio signal corresponding to the analog signal with the amplitude amplified by the second output unit to the second communication device.

Another aspect of the present invention is a mobile relay device that includes: an antenna configured to receive a radio signal with a predetermined band including a desired frequency band associated with a communication device; a measurement unit configured to measure a signal level of an analog signal corresponding to the received radio signal in the predetermined band; a first output unit configured to amplify an amplitude of the input analog signal and extract the analog signal with the desired frequency band from the analog signal with the amplified amplitude when the analog signal corresponding to the received radio signal is input; a second output unit configured to extract the analog signal with the desired frequency band from the input analog signal and amplify an amplitude of the extracted analog signal when the analog signal corresponding to the received radio signal is input; and a switching control unit configured to input the analog signal corresponding to the received radio signal to the first output unit when a signal level of the analog signal other than the desired frequency band in the predetermined band is less than a threshold, and to input the analog signal corresponding to the received radio signal to the second output unit when the signal level of the analog signal other than the desired frequency band in the predetermined band is equal to or greater than the threshold.

Still another aspect of the present invention is a wireless communication method executed by a wireless communication system including a first communication device, a second communication device, and a mobile relay device. The method includes an antenna for receiving a first radio signal with a predetermined band including a desired frequency band associated with the first communication device; a measurement step of measuring a signal level of an analog signal corresponding to the received first radio signal in the predetermined band; a first output step of amplifying an amplitude of the input analog signal and extracting the analog signal with the desired frequency band from the analog signal with the amplified amplitude when the analog signal corresponding to the received first radio signal is input; a second output step of extracting the analog signal with the desired frequency band from the input analog signal and amplifying the amplitude of the extracted analog signal when the analog signal corresponding to the received first radio signal is input; a switching control step of inputting the analog signal corresponding to the received first radio signal to a first output unit preforming the first output step when a signal level of the analog signal other than the desired frequency band in the predetermined band is less than a threshold, and inputting the analog signal corresponding to the received first radio signal to a second output unit performing the second output step when the signal level of the analog signal other than the desired frequency band in the predetermined band is equal to or greater than the threshold; and a transmission step of transmitting a second radio signal corresponding to the analog signal extracted by the first output unit or a third radio signal corresponding to the analog signal with the amplitude amplified by the second output unit to the second communication device.

Advantageous Effects of Invention

According to the present invention, it is possible to inhibit deterioration in reception sensitivity of a radio signal.

DESCRIPTION OF EMBODIMENTS

Embodiments of the present invention will be described in detail with reference to the drawings.

First Embodiment

Figure 1:
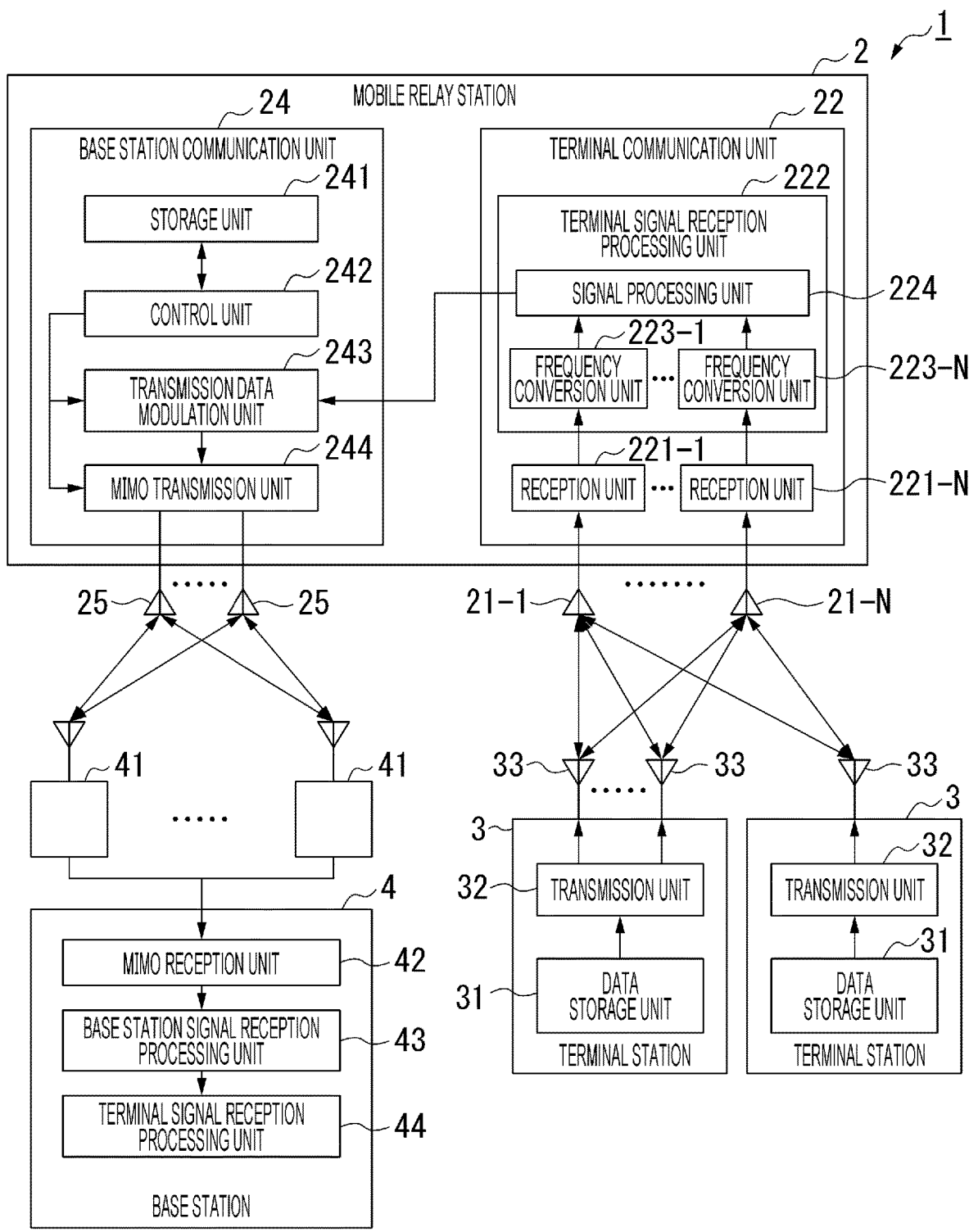
FIG. 1 is a diagram illustrating an exemplary configuration of a wireless communication system according to a first embodiment.

FIG. 1 is a diagram illustrating an exemplary configuration of a wireless communication system 1 according to a first embodiment. The wireless communication system 1 includes a mobile relay station 2, a terminal station 3, and a base station 4. Although any number of the mobile relay stations 2, the terminal stations 3, and the base stations 4 included in the wireless communication system 1 can be used, it is assumed that the number of terminal stations 3 is large.

The mobile relay station 2 is mounted on a mobile body. The mobile relay station 2 is an example of a relay device in which a communicable area moves over time. The mobile relay station 2 is provided in, for example, a low earth orbit (LEO) satellite. An altitude of the LEO satellite is equal to or less than 2000 km and the LEO satellite orbits the earth once in about 1.5 hours. The terminal station 3 and the base station 4 are installed on the earth such as on the ground or on the sea. The terminal station 3 is, for example, an IoT terminal. The terminal station 3 collects data such as environmental information (for example, a temperature) detected by a sensor and wirelessly transmits the collected data to the mobile relay station 2. FIG. 1 illustrates, as an example, two terminal stations 3 among many terminal stations 3. The mobile relay station 2 receives data transmitted from each of the plurality of terminal stations 3 by a radio signal while moving above the terminal station 3. The mobile relay station 2 wirelessly transmits the received data to the base station 4. The base station 4 receives data collected by the mobile relay station 2 from the terminal station 3 from the mobile relay station 2.

As the mobile relay station, it is conceivable to use a relay station (a relay device) mounted on an unmanned aerial vehicle such as a stationary satellite, a drone, or a high altitude platform station (HAPS). However, in the case of a relay station mounted on a stationary satellite, although a coverage area (footprint) on the ground is broad, a link budget for an IoT terminal installed on the ground is very small due to the high altitude. On the other hand, in the case of a drone or a relay station mounted on an HAPS, although the link budget is high, the coverage area is narrow. The drone requires a battery and the HAPS requires a solar panel. In the present embodiment, the mobile relay station 2 is mounted on the LEO satellite. Therefore, a link budget falls within a predetermined limit. In addition, since an LEO satellite orbits outside of the atmosphere, air resistance of the LEO satellite is small and fuel consumption of the LEO satellite is also small. Further, a footprint of the LEO satellite is larger than that in a case where a relay station is mounted on a drone or an HAPS.

However, since the mobile relay station 2 mounted on the LEO satellite performs communication while moving at a high speed, a Doppler shift occurs in the radio signal. The link budget of the relay station (relay device) mounted on the LEO satellite is smaller than that in a case where the relay station is mounted on the drone or the HAPS. Accordingly, the mobile relay station 2 receives a radio signal from the terminal station 3 using a plurality of antennas and transmits the radio signal to the base station 4 using the plurality of antennas. Communication quality can be improved by a diversity effect and a beamforming effect of communication using the plurality of antennas. In the present embodiment, the mobile relay station 2 relays a radio signal received from the terminal station 3 using the plurality of antennas to the base station 4 using multiple input multiple output (MIMO).

A configuration of each device will be described.

The mobile relay station 2 includes N antennas 21 (where N is an integer equal to or greater than of 2), a terminal communication unit 22, a base station communication unit 24, and a plurality of antennas 25. The N antennas 21 are denoted as antennas 21-1 to 21-N.

The terminal communication unit 22 includes N reception units 221 and a terminal signal reception processing unit 222. The N reception units 221 are denoted as reception units 221-1 to 221-N. The reception unit 221-*n* (where n is an integer between 1 and N) receives the terminal uplink signal through the antenna 21-*n*.

The terminal signal reception processing unit 222 performs a reception process for the terminal uplink signal. The terminal signal reception processing unit 222 includes N frequency conversion units 223 and a signal processing unit 224. The N frequency conversion units 223 are denoted as frequency conversion units 223-1 to 223-N.

The frequency conversion unit 223-*n* (where n is an integer equal to or greater than 1 and equal to or less than N) converts the 920 MHz band radio frequency (RF) signal received by the reception unit 221-*n* into a baseband signal using a quadrature demodulator or the like. The frequency conversion unit 223-*n* outputs the baseband signal to the signal processing unit 224.

The signal processing unit 224 combines baseband signals (symbols) input from the frequency conversion units 223-1 to 223-N. For example, the signal processing unit 224 adds and combines the baseband signals of reception systems. For example, the signal processing unit 224 may multiply and combine the baseband signals of the respective reception systems by a weight for performing amplitude correction and phase correction so that the baseband signals of the respective reception systems are intensified and combined. Combining baseband signals of the respective reception systems by performing the amplitude correction and the phase correction corresponds to reception beam control.

The signal processing unit 224 includes an analog-to-digital conversion unit. A frequency used in the 920 MHz band low power wide area (LPWA) in Japan is a range from 915 MHz to 928 MHz (13 MHz width). The analog-to-digital conversion unit of the signal processing unit 224 performs sampling at a sampling rate equal to or greater than 26 MHz, which is twice the frequency (sampling theorem) used by the 920 MHz band LPWA, for example. The signal processing unit 224 converts a baseband signal (analog signal) into a baseband signal (digital signal). The signal processing unit 224 performs frame detection and Doppler shift compensation on the baseband signal (digital signal). The frame detection is performed to detect a terminal uplink signal (frame) from radio signals constantly received by the plurality of antennas 21. The signal processing unit 224 combines results of the frame detection and the Doppler shift compensation. The signal processing unit 224 outputs an obtained symbol (combination result) to the base station communication unit 24.

The signal processing unit 224 may perform reception beam control by analog processing. In this case, the signal processing unit 224 combines baseband signals input from the frequency conversion units 223-1 to 223-N through analog processing. The signal processing unit 224 outputs the combined baseband signal (analog signal) to the base station communication unit 24.

The base station communication unit 24 is a functional unit that relays a terminal uplink signal to the base station 4 through MIMO. The base station communication unit 24 includes a storage unit 241, a control unit 242, a transmission data modulation unit 243, and a MIMO transmission unit 244. The storage unit 241 stores a weight at each transmission time of a base station downlink signal transmitted from each antenna 25 in advance. The transmission time may be expressed as, for example, a time passed from a transmission start timing. The weight at each transmission time is derived based on orbit information of the LEO satellite and a position of each antenna station 41. The LEO orbit information is information with which the position, velocity, movement direction, and the like of the LEO satellite can be obtained at any time. The weight at each transmission time of the base station downlink signal may be constant regardless of the transmission time.

The control unit 242 gives an instruction for the weight for each transmission time read from the storage unit 241 to the MIMO transmission unit 244. The transmission data modulation unit 243 acquires the baseband signal output from the signal processing unit 224 as transmission data. The transmission data modulation unit 243 converts the acquired transmission data into a parallel signal and executes a modulation process on the parallel signal. The MIMO transmission unit 244 generates the base station downlink signal transmitted from each antenna 25 by weighting the parallel signal using the weight instructed from the control unit 242. The MIMO transmission unit 244 transmits the generated base station downlink signal from the antenna 25 through, for example, MIMO.

The terminal station 3 includes a data storage unit 31, a transmission unit 32, and one or a plurality of antennas 33. The data storage unit 31 stores sensor data and the like. The transmission unit 32 reads the sensor data from the data storage unit 31 as terminal transmission data. The transmission unit 32 transmits a terminal uplink signal (radio signal) including the read terminal transmission data from the antenna 33. The transmission unit 32 transmits a radio signal using, for example, LPWA. LPWA includes a wireless communication scheme such as LoRaWAN (registered trademark), Sigfox (registered trademark), Long Term Evolution for Machines (LTE-M), and narrow band (NB)—IoT, but any wireless communication scheme can be used. The transmission unit 32 may perform communication with another terminal station 3 by time division multiplexing, orthogonal frequency division multiplexing (OFDM), MIMO, or the like. The transmission unit 32 determines a channel and a transmission timing to be used by the own station to transmit a terminal uplink signal in accordance with a method determined in advance in a wireless communication scheme to be used. The transmission unit may form beams of radio signals transmitted from the plurality of antennas 33 in accordance with a method determined in advance in a wireless communication scheme to be used.

The base station 4 includes a plurality of antenna stations 41, a MIMO reception unit 42, a base station signal reception processing unit 43, and a terminal signal reception processing unit 44.

The antenna stations 41 are arranged at positions separated from the other antenna stations 41 so that arrival angle differences of the radio signals transmitted from the plurality of antennas 25 of the mobile relay station 2 become large. Each antenna station 41 converts the base station downlink signal received from the mobile relay station 2 into an electrical signal and outputs the converted electrical signal to the MIMO reception unit 42.

The MIMO reception unit 42 aggregates the base station downlink signals received from the plurality of antenna stations 41. The MIMO reception unit 42 stores a weight at each reception time for the base station downlink signal received by each antenna station 41 based on the orbit information of the LEO satellite and the position of each antenna station 41. The reception time may be expressed as a time passed from the reception start timing. The MIMO reception unit 42 multiplies the base station downlink signal input from each antenna station 41 by a weight corresponding to the reception time of the base station downlink signal. MIMO reception unit 42 combines the received signals multiplied by the weights. The same weight may be used regardless of the reception time. The base station signal reception processing unit 43 converts the combined received signal (RF signal) into a baseband signal. The base station signal reception processing unit 43 outputs the baseband signal to the terminal signal reception processing unit 44.

The terminal signal reception processing unit 44 performs a decoding process on the terminal uplink signal. The terminal signal reception processing unit 44 decodes the symbol of the terminal uplink signal indicated by the baseband signal and obtains terminal transmission data transmitted from the terminal station 3.

Next, dynamic switching control for a signal processing system in the mobile relay station 2 will be described.

A low earth orbiting satellite (mobile object) on which the mobile relay station 2 is mounted passes over a predetermined position a predetermined number of times per day along a predetermined orbit. Here, the degree of influence (degree of interference) of unnecessary waves with respect to reception sensitivity of a terminal uplink signal differs depending on a position of the mobile relay station 2.

For example, when the mobile relay station 2 is passing over an urban area, the degree of interference (degree of influence) of unnecessary waves (disturbance waves) transmitted from many terminals and the like of a cellular system in the urban area with terminal uplink signals (desired waves) is large. When the mobile relay station 2 is passing over the ground or the sea away from the urban area, the degree of interference of unnecessary waves with a terminal uplink signals is small.

For example, the degree of interference of unnecessary waves transmitted from a base station (earth station) that executes communication with a stationary satellite with a terminal uplink signal increases when the mobile relay station 2 passes on a route connecting the base station and the stationary satellite.

Accordingly, in the first embodiment, the mobile relay station 2 that orbits the earth measures information regarding a signal level (reception power) of a radio signal in advance as radio wave environment information. Thus, the mobile relay station 2 stores history information including the positional information of the mobile relay station 2 at which a signal level of a radio signal is equal to or higher than a threshold in advance. The mobile relay station 2 determines whether a position at which a signal level of an unnecessary wave is equal to or higher than the threshold in the history information is the same as a present position of the mobile relay station 2. The mobile relay station 2 dynamically switches the signal processing system for the received radio signal according to whether the position at which the signal level of the unnecessary wave is equal to or higher than the threshold in the history information is the same as the present position of the mobile relay station 2. This threshold is, for example, a value of an input level "$P_1 dB$" at which an amplifier provided in the mobile relay station 2 starts an operation in a nonlinear region. The threshold may be a value having a margin of about several dB with respect to the input level "$P_1 dB$".

The mobile relay station 2 switches the signal processing system related to the received radio signal (RF signal) to, for example, a system in which the band-pass filter is at a previous stage of the low noise amplifier before or during passage through a position (for example, a sky above an urban area) at which an influence of the unnecessary wave is large. The mobile relay station 2 switches the signal processing system related to the received radio signal to a system in which, for example, the low noise amplifier is at a previous stage of the bandpass filter after passing through a position at which the influence of the unnecessary wave is large.

Figure 2:
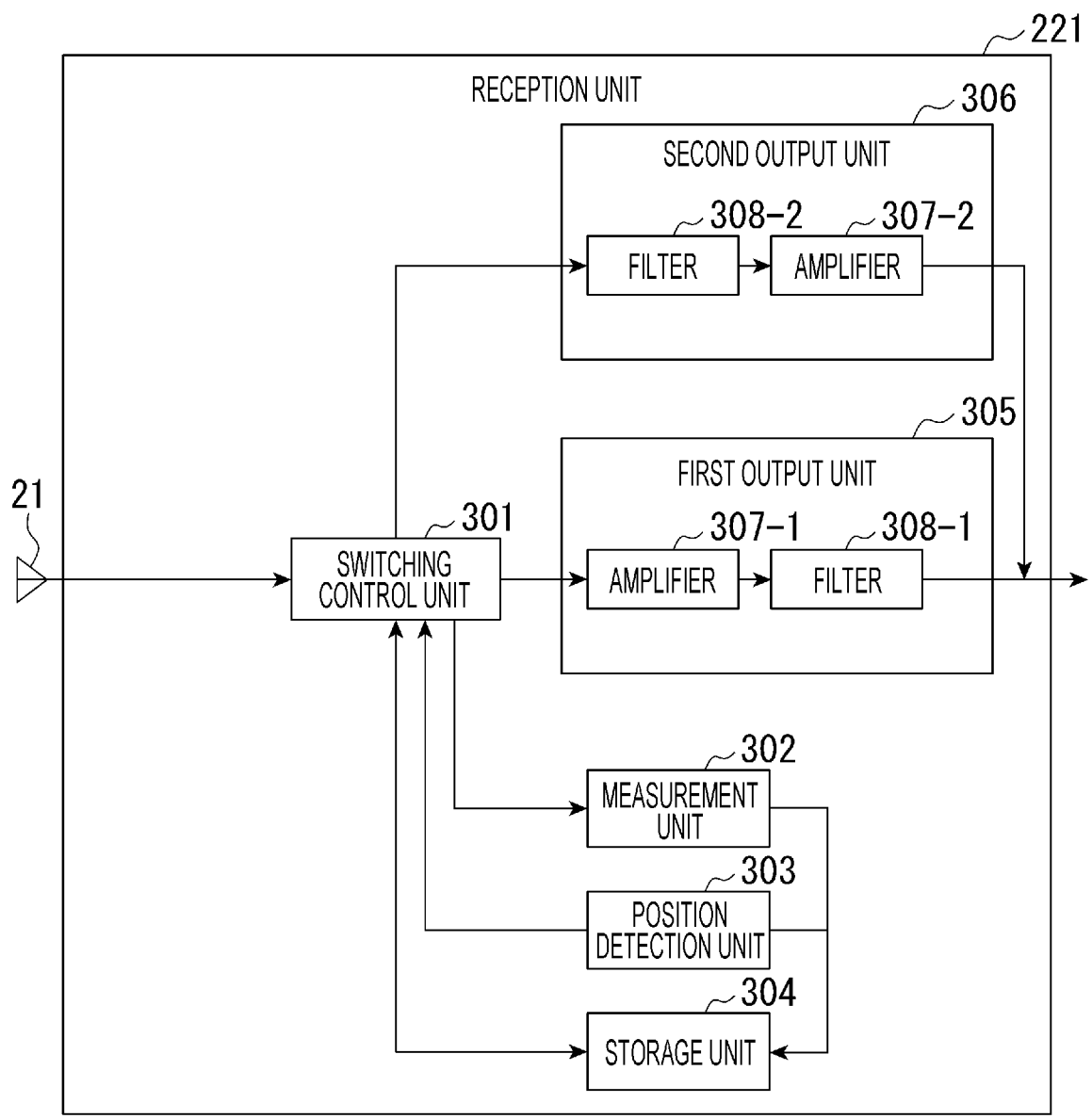
FIG. 2 is a diagram illustrating an exemplary configuration of a reception unit according to the first embodiment.

FIG. 2 is a diagram illustrating an exemplary configuration of the reception unit 221 according to the first embodiment. The reception unit 221 includes an antenna 21, a switching control unit 301, a measurement unit 302, a position detection unit 303, a storage unit 304, a first output unit 305, and a second output unit 306. Here, the measurement unit 302, the position detection unit 303, and the storage unit 304 may be provided in at least one of the reception units 221-1 to 221-N. The switching control unit 301 of each of the reception units 221 may share a measurement result of a signal level in any of the reception units 221. The switching control unit 301 includes, for example, an RF switch (Radio Frequency switch).

The first output unit 305 includes an amplifier 307-1 and a filter 308-1. An output terminal of the switching control unit 301 and an input terminal of the amplifier 307-1 are connected. An output terminal of the amplifier 307-1 and an input terminal of the filter 308-1 are connected. An output terminal of the filter 308-1 and an input terminal of the frequency conversion unit 223 are connected.

The second output unit 306 includes an amplifier 307-2 and a filter 308-2. An output terminal of the switching control unit 301 and an input terminal of the filter 308-2 are connected. An output terminal of the filter 308-2 and an input terminal of the amplifier 307-2 are connected. An output terminal of the amplifier 307-2 and an input terminal of the frequency conversion unit 223 are connected.

Each antenna 21 receives a terminal uplink signal with a desired frequency band from one or more terminal stations 3. The desired frequency band is a frequency band associated with the terminal station 3 and is, for example, a 920 MHz band. Because a propagation distance of the terminal uplink signal is long, a signal level (received power) of the terminal uplink signal is weak. Each antenna 21 receives a radio signal with a predetermined band including a desired frequency band. In the received radio signal, a radio signal (unnecessary wave) other than the desired frequency band may interfere with a weak terminal uplink signal (desired wave) of the desired frequency band.

Figure 3:
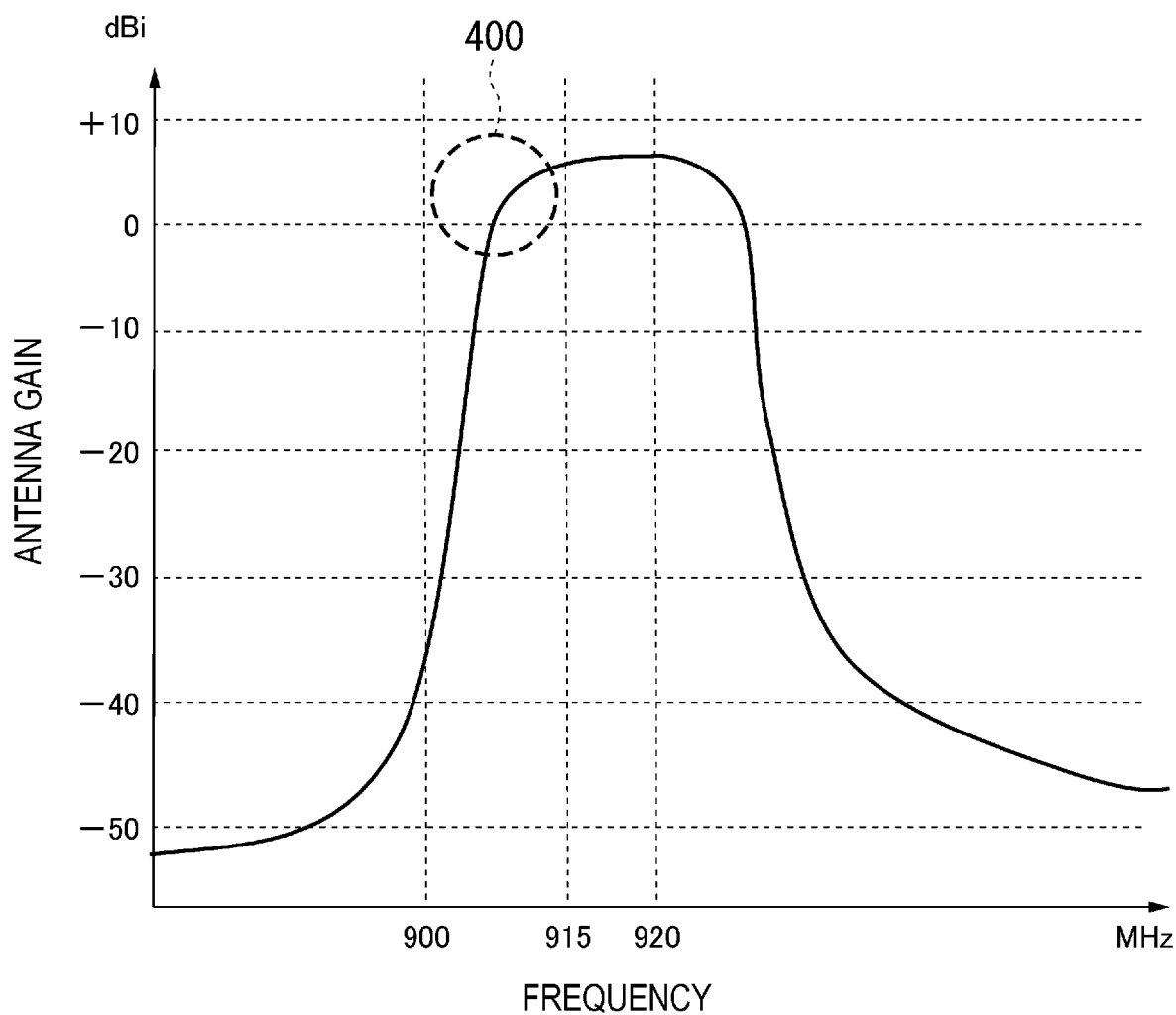
FIG. 3 is a diagram illustrating an example of frequency characteristics of an antenna gain of a reception antenna according to the first embodiment.

FIG. 3 is a diagram illustrating an example of frequency characteristics of an antenna gain of a reception antenna according to the first embodiment. The horizontal axis represents a frequency. The vertical axis represents an antenna gain of the antenna 21. In FIG. 3, unnecessary waves 400 in a band from about 900 MHz to about 915 MHz used in a cellular system such as Long Term Evolution (LTE) and a radio signal (desired wave) with a desired frequency band may be received with an equal antenna gain. Therefore, when the unnecessary waves 400 simultaneously arrive at the mobile relay station 2 and are combined, the unnecessary waves 400 are received by the antenna 21 at a signal level considerably greater than the radio signal with the desired frequency band. In this case, it is necessary to inhibit the signal level of the unnecessary waves 400 using a band-pass filter that passes a signal with a desired frequency band.

Referring back to FIG. 2, description of the exemplary configuration of the reception unit 221 will be continued.

The switching control unit 301 is a functional unit that switches output destinations of the radio signals received by the plurality of antennas 21 to either the first output unit 305 or the second output unit 306 at the subsequent stage. The switching control unit 301 refers to the history information stored in the storage unit 304 for a satellite position "p(t)" at a time "t" in an orbit around the earth. The history information includes information regarding signal levels of the unnecessary waves in the past (for example, in orbit at the previous time), satellite positional information, and reception time information.

In the history information, when a radio signal (unnecessary wave) with a band other than the desired frequency band does not interfere with a weak terminal uplink signal with the desired frequency band (when the signal level of the unnecessary wave is less than a given value), the switching control unit 301 inputs an analog signal corresponding to the received radio signal to the first output unit 305. That is, when a present position of the mobile relay station 2 and a past position of the mobile relay station 2 are the same and the signal level of the analog signal corresponding to the radio signal at the position in the history information is less than the threshold, the switching control unit 301 inputs the analog signal to the first output unit 305.

When a radio signal (unnecessary wave) with a band other than the desired frequency band interferes with the weak terminal uplink signal with the desired frequency band in the history information, the switching control unit 301 inputs an analog signal corresponding to the received radio signal to the second output unit 306. That is, when the present position of the mobile relay station 2 and the past position of the mobile relay station 2 are the same and the signal level of the analog signal corresponding to the radio signal at the position in the history information is equal to or greater than the threshold, the switching control unit 301 inputs the analog signal to the second output unit 306.

The measurement unit 302 is a functional unit that measures a signal level of an analog signal corresponding to a radio signal in each antenna 21 or the switching control unit 301 and is, for example, a spectrum analysis device or a power meter. The measurement unit 302 acquires the analog signal generated by the switching control unit 301 from the switching control unit 301. The measurement unit 302 measures the signal level of the analog signal corresponding to the received radio signal with a predetermined band in which the antenna 21 has a gain. The measurement unit 302 may stop the measurement process in a period set in advance as a period in which measurement of an unnecessary wave is unnecessary.

The position detection unit 303 detects the position of the mobile relay station 2 at a predetermined cycle based on track information of the mobile relay station 2. The position detection unit 303 records information regarding the position of the mobile relay station 2 in the storage unit 304.

The storage unit 304 stores a signal level of an analog signal corresponding to a radio signal with a predetermined band in advance as history information in association with the position of the mobile relay station 2.

In the first output unit 305, an analog signal corresponding to a radio signal with less interference due to an unnecessary wave is input from the switching control unit 301 to the amplifier 307-1. The amplifier 307-1 amplifies the amplitude of the input analog signal. The amplifier 307-1 outputs the analog signal with the amplified amplitude to the filter 308-1.

The filter 308-1 is a bandpass filter that passes a signal with a desired frequency band. The filter 308-1 extracts an analog signal with a desired frequency band from the analog signal with the amplitude amplified by the amplifier 307-1. Accordingly, it is possible to inhibit the signal level of an unnecessary wave other than the desired frequency band. The filter 308-1 outputs the extracted analog signal to the frequency conversion unit 223.

As described above, in the first output unit 305, the amplifier 307-1 to which an analog signal with less interference is input is provided at the previous stage of the filter 308-1. Therefore, even if there is an insertion loss of the filter 308-1, a noise figure (NF) of the amplifier 307-1 rarely increases.

In the second output unit 306, an analog signal corresponding to a radio signal having much interference due to the unnecessary wave is input to the filter 308-2 from the switching control unit 301. The filter 308-2 is a bandpass filter that passes a signal with a desired frequency band. The filter 308-2 extracts an analog signal with the desired frequency band from the input analog signal. Accordingly, it is possible to inhibit the signal level of an unnecessary wave other than the desired frequency band. The filter 308-2 outputs the extracted analog signal to the amplifier 307-2.

The amplifier 307-2 amplifies the amplitude of the extracted analog signal. Here, the noise figure of the entire reception unit 221 in a case where the analog signal is input to the second output unit 306 is greater than the noise figure of the entire reception unit 221 in a case where the analog signal is input to the first output unit 305 due to the insertion loss of the filter 308-2 at the previous stage. However, in the second output unit 306, the signal level of the unnecessary wave is inhibited by the filter 308-2 at the previous stage. Therefore, it is possible to prevent leakage of an unnecessary wave signal component into the desired frequency band due to the nonlinear amplification of the unnecessary wave, and it is possible to prevent deterioration in reception sensitivity.

The amplifier 307-2 outputs the analog signal with the amplified amplitude to frequency conversion unit 223.

For leakage of the unnecessary wave signal component, for example, in a case where a high-power interference signal (an analog signal of an unnecessary wave) with a frequency band (hereinafter referred to as an "adjacent frequency band") adjacent to the frequency band of the desired signal is input to the amplifier 307-1 in the first output unit 305, the interference signal is amplified in a nonlinear region of input/output characteristics of the amplifier 307-1. Therefore, the interference signal is distorted. The distortion of the interference signal (disturbance of a spectrum of the interference signal) results in an increase in a signal component leakage amount out of the band of the interference signal. As described above, in the first output unit 305, when the high-power interference signal in the adjacent frequency band is input to the amplifier 307-1, the leakage amount of the interference signal in the adjacent frequency band into the frequency band of the desired signal increases.

Next, an operation of the wireless communication system 1 will be described.

Figure 4:
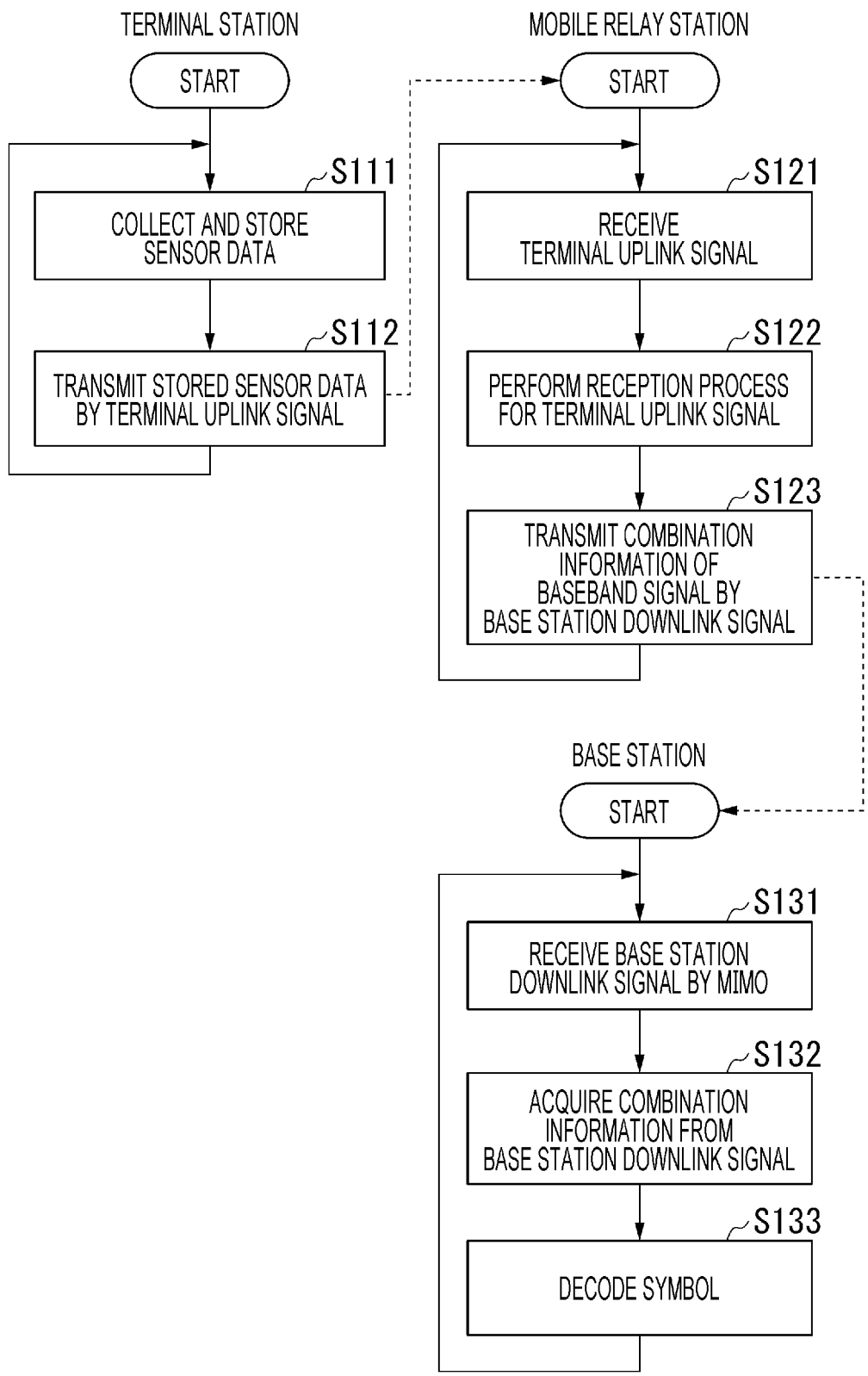
FIG. 4 is a flowchart illustrating a process of a wireless communication system according to the first embodiment.

FIG. 4 is a flowchart illustrating a process of the wireless communication system 1. The terminal station 3 acquires data detected by a sensor (not illustrated) provided in the terminal station 3 at any time and writes the acquired data in the data storage unit 31 (step S111). The transmission unit 32 reads the sensor data from the data storage unit 31 as terminal transmission data. The transmission unit 32 wirelessly transmits a terminal uplink signal including terminal transmission data from the antenna 33 at a transmission start timing derived in advance based on the orbit information of the LEO satellite equipped with the mobile relay station 2 (step S112). The terminal station 3 repeats the process from step S111.

The reception units 221-1 to 221-N of the mobile relay station 2 receive the terminal uplink signals transmitted from the terminal station 3 (step S121). In accordance with the wireless communication scheme of the transmission source terminal station 3, there is a case where the terminal uplink signal is received from only one terminal station 3 in a time division manner at the same frequency and there is a case where the terminal uplink signals are simultaneously received from the plurality of terminal stations 3 at the same frequency. The terminal signal reception processing unit 222 performs signal processing on the terminal uplink signal received in step S121 (step S122). Specifically, the frequency conversion unit 223-$n$ specifies the wireless communication scheme based on the information specific to the wireless communication scheme included in the terminal uplink signal received by the reception unit 221-$n$. The reception units 221-1 to 221-N output baseband signals corresponding to the terminal uplink signals to the signal processing unit 224 in accordance with the specified wireless communication scheme. The signal processing unit 224 outputs, to the transmission data modulation unit 243, combination information that is a combination result of the baseband signals input from the frequency conversion units 223-1 to 223-N.

Since the signals transmitted from the terminal station 3 have a correlation, the signals are enhanced by combining baseband signals. An influence of noise randomly added to the baseband signal is reduced by combining the baseband signals. Therefore, for the terminal uplink signal received by the mobile relay station 2 at the same time from only one terminal station 3, a diversity effect can be obtained. Further, for the terminal uplink signals received by the mobile relay station 2 from the plurality of terminal stations 3 at the same time, combining the baseband signals corresponds to performing MIMO communication.

The transmission data modulation unit 243 acquires the combination information as transmission data from the signal processing unit 224. The transmission data modulation unit 243 performs parallel conversion on the transmission data and then modulates the converted transmission data. The MIMO transmission unit 244 weights the transmission data modulated by the transmission data modulation unit 243 by using the weight instructed from the control unit 242. Accordingly, the MIMO transmission unit 244 generates the base station downlink signal transmitted from each antenna 25. The MIMO transmission unit 244 transmits each generated base station downlink signal from the antenna 25 by MIMO (step S123). The mobile relay station 2 repeats the process from step S121.

Each antenna station 41 of the base station 4 receives the base station downlink signal from the mobile relay station 2 (step S131). Each antenna station 41 converts the received base station downlink signal into an electrical signal and outputs the converted electrical signal as a received signal to the MIMO reception unit 42. The MIMO reception unit 42 synchronizes timings of the received signals received from the antenna stations 41. The MIMO reception unit 42 multiplies the received signal received by each antenna station 41 by the weight and adds the multiplication results. As a result, the base station signal reception processing unit 43 acquires the combination information from the received signal (step S132). The base station signal reception processing unit 43 outputs the combination information to the terminal signal reception processing unit 44.

The terminal signal decoding unit 441 of the terminal signal reception processing unit 44 decodes the symbol of the terminal uplink signal indicated by the combination information to obtain terminal transmission data transmitted from the terminal station 3 (step S133). The terminal signal decoding unit 441 can also use a decoding scheme such as successive interference cancellation (SIC) of which a calculation load is large. The base station 4 repeats the process from step S131.

Figure 5:
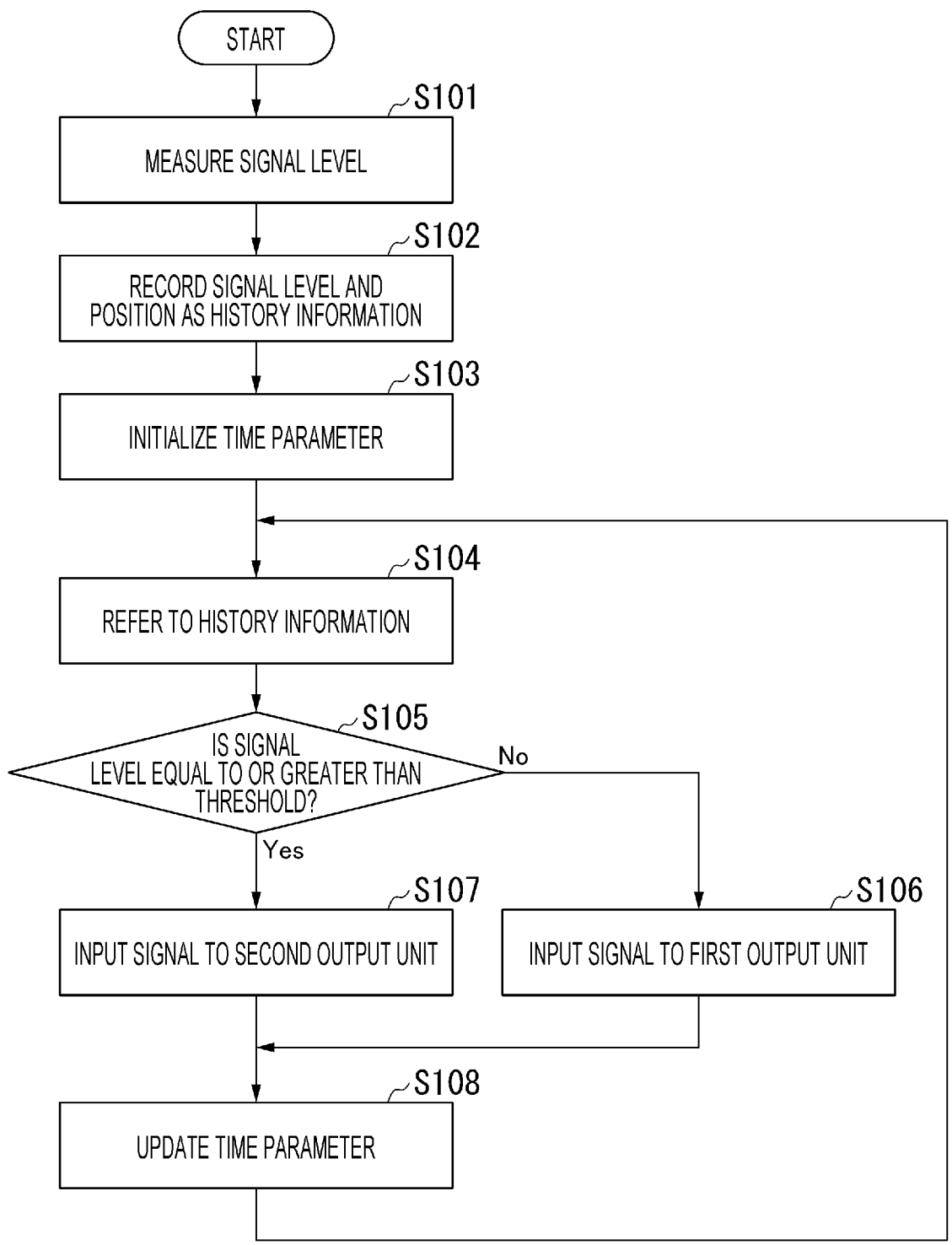
FIG. 5 is a flowchart illustrating an exemplary operation of a reception unit according to the first embodiment.

FIG. 5 is a flowchart illustrating an exemplary operation of the reception unit 221 according to the first embodiment. While the mobile relay station 2 is orbing the earth, the measurement unit 302 measures the signal level of the radio signal in advance for a predetermined band in which the antenna 21 has a gain. The position detection unit 303 detects the position of the mobile relay station 2 based on the track information of the mobile relay station 2 (step S101). The storage unit 304 stores the signal level and the reception time of the analog signal corresponding to the radio signal with the predetermined band as history information in advance in association with the position of the mobile relay station 2 (step S102).

The switching control unit 301 initializes a time parameter "t" to "t=1" (step S103). When the present position of the mobile relay station 2 (relay device) is the same as the position of the mobile relay station 2 in the history information (a past position of the mobile relay station 2), the switching control unit 301 further refers to the history information stored in the storage unit 304. For example, the switching control unit 301 acquires the information regarding the signal level at the position from the history information. It may be determined whether the reception time and the present time in the history information belong to the same time zone. When it is determined that the reception time and the present time belong to the same time zone, the switching control unit 301 may acquire the information regarding the signal level from the history information (step S104). The switching control unit 301 determines whether or not the signal level associated with the position in the history information is equal to or higher than a threshold (step S105).

When the signal level is less than the threshold (step S105: No), the switching control unit 301 inputs an analog signal (a signal in which the degree of interference is low) corresponding to the received radio signal to the first output unit 305 (step S106). When the signal level is equal to or higher than the threshold (step S105: Yes), the switching control unit 301 inputs an analog signal (a signal in which the degree of interference is high) corresponding to the received radio signal to the second output unit 306 (step S107). The switching control unit 301 updates the time parameter "t" to "t=t+1" (step S108).

According to the present embodiment, the mobile relay station receives the terminal uplink signal of the terminal station by diversity reception, MIMO reception, or the like. Therefore, the link budget with the terminal station can be improved. The mobile relay station transmits the terminal uplink signal to the base station by MIMO. Accordingly, the mobile relay station can collectively transmit terminal uplink signals received from many terminal stations to the base station with high quality in volume.

As described above, the mobile relay station 2 moves, for example, along an orbit around the earth. Each antenna 21 receives a first radio signal with a predetermined band including a desired frequency band (for example, 920 MHz) associated with the terminal station 3 (first communication device). In the first radio signal, an unnecessary wave may interfere with the terminal uplink signal. The measurement unit 302 measures a signal level of an analog signal corresponding to the received first radio signal with a predetermined band in which the antenna 21 has a gain. The position detection unit 303 detects the position of the mobile relay station 2 (relay device) (relay apparatus). The storage unit 304 stores the signal level of the analog signal corresponding to the first radio signal with the predetermined band as history information in association with the position of the mobile relay station 2.

When the present position of the mobile relay station 2 (relay device) is the same as the position of the mobile relay station 2 in the history information (a past position of the mobile relay station 2), the switching control unit 301 further refers to the history information stored in the storage unit 304.

When the signal level of the analog signal (the analog signal of the unnecessary wave) other than the desired frequency band in the predetermined band is less than the threshold (when the interference with the desired wave is small), the switching control unit 301 inputs the analog signal corresponding to the received first radio signal to the first output unit 305. For example, when the present position of the mobile relay station 2 (relay device) and the position of the mobile relay station 2 in the history information (the position of the mobile relay station 2 in the past) are the same and the signal level associated with the position in the history information is less than the threshold, the switching control unit 301 inputs an analog signal corresponding to the received first radio signal to the first output unit 305.

When the signal level of the analog signal with the predetermined band other than the desired frequency band is equal to or higher than the threshold (when the interference with the desired wave is large), the switching control unit 301 inputs the analog signal corresponding to the received first radio signal to the second output unit 306. For example, when the present position of the mobile relay station 2 and the position of the mobile relay station 2 in the history information are the same and the signal level associated with the position in the history information is equal to or greater than the threshold, the switching control unit 301 inputs an analog signal corresponding to the received first radio signal to the second output unit 306.

When an analog signal corresponding to the received first radio signal is input to the first output unit 305, the amplifier 307-1 amplifies the amplitude of the input analog signal. The filter 308-1 (bandpass filter) extracts an analog signal with a desired frequency band from the analog signal with the amplified amplitude. The filter 308-1 outputs the extracted analog signal to the frequency conversion unit 223.

When an analog signal corresponding to the received first radio signal is input to the second output unit 306, the filter 308-2 (band-pass filter) extracts an analog signal with a desired frequency band from the input analog signal. The amplifier 307-2 amplifies the amplitude of the extracted analog signal. The amplifier 307-2 outputs the analog signal with the amplified amplitude to frequency conversion unit 223.

Accordingly, it is possible to inhibit a decrease in the reception sensitivity of the radio signal. The MIMO transmission unit 244 (transmission unit) may transmit the second radio signal (base station downlink signal) corresponding to the analog signal output from the first output unit 305 to the frequency conversion unit 223 or the third radio signal (base station downlink signal) corresponding to the analog signal output from the second output unit 306 to the frequency conversion unit 223 to the base station 4 (second communication device).

First Modification of First Embodiment

In a first modification of the first embodiment, the mobile relay station accumulates the combination information of the baseband signal and wirelessly transmits a base station downlink signal including the accumulated combination information to the base station 4. The first modification of the first embodiment will be described focusing on differences from the first embodiment.

Figure 6:
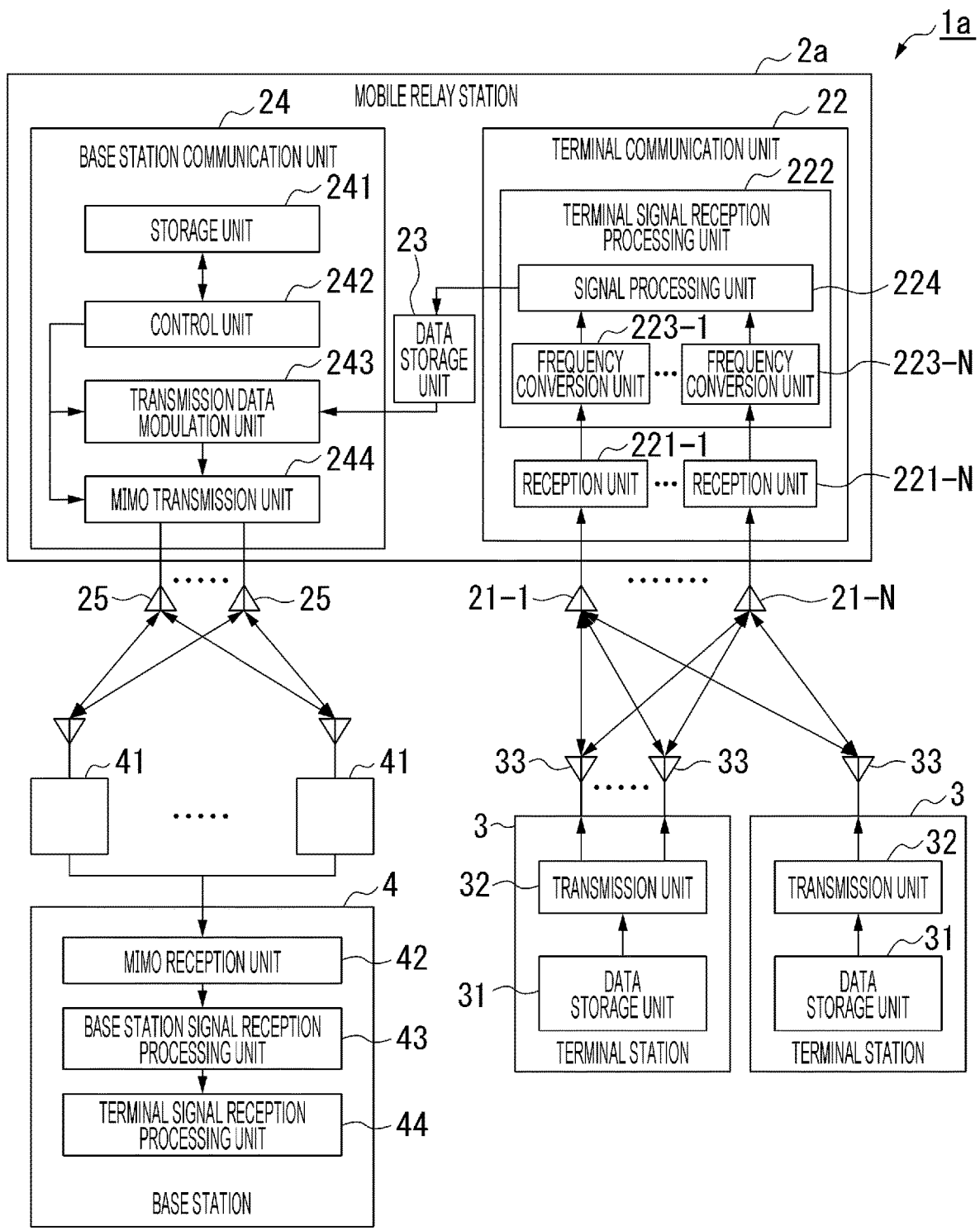
FIG. 6 is a diagram illustrating an exemplary configuration of a wireless communication system according to a first modification of the first embodiment.

FIG. 6 is a diagram illustrating an exemplary configuration of a wireless communication system 1a according to the first modification of the first embodiment. The mobile relay station 2a includes N antennas 21, a terminal communication unit 22, a data storage unit 23, a base station communication unit 24, and a plurality of antennas 25. The data storage unit 23 stores combination information of the baseband signal combined by the signal processing unit 224. The data storage unit 23 outputs the combination information to the transmission data modulation unit 243.

Second Modification of First Embodiment

In a second modification of the first embodiment, the mobile relay station 2 wirelessly transmits the base station downlink signal including the decoding result of the combination information to the base station 4. The second modification of the first embodiment will be described focusing on differences from the first embodiment.

Figure 7:
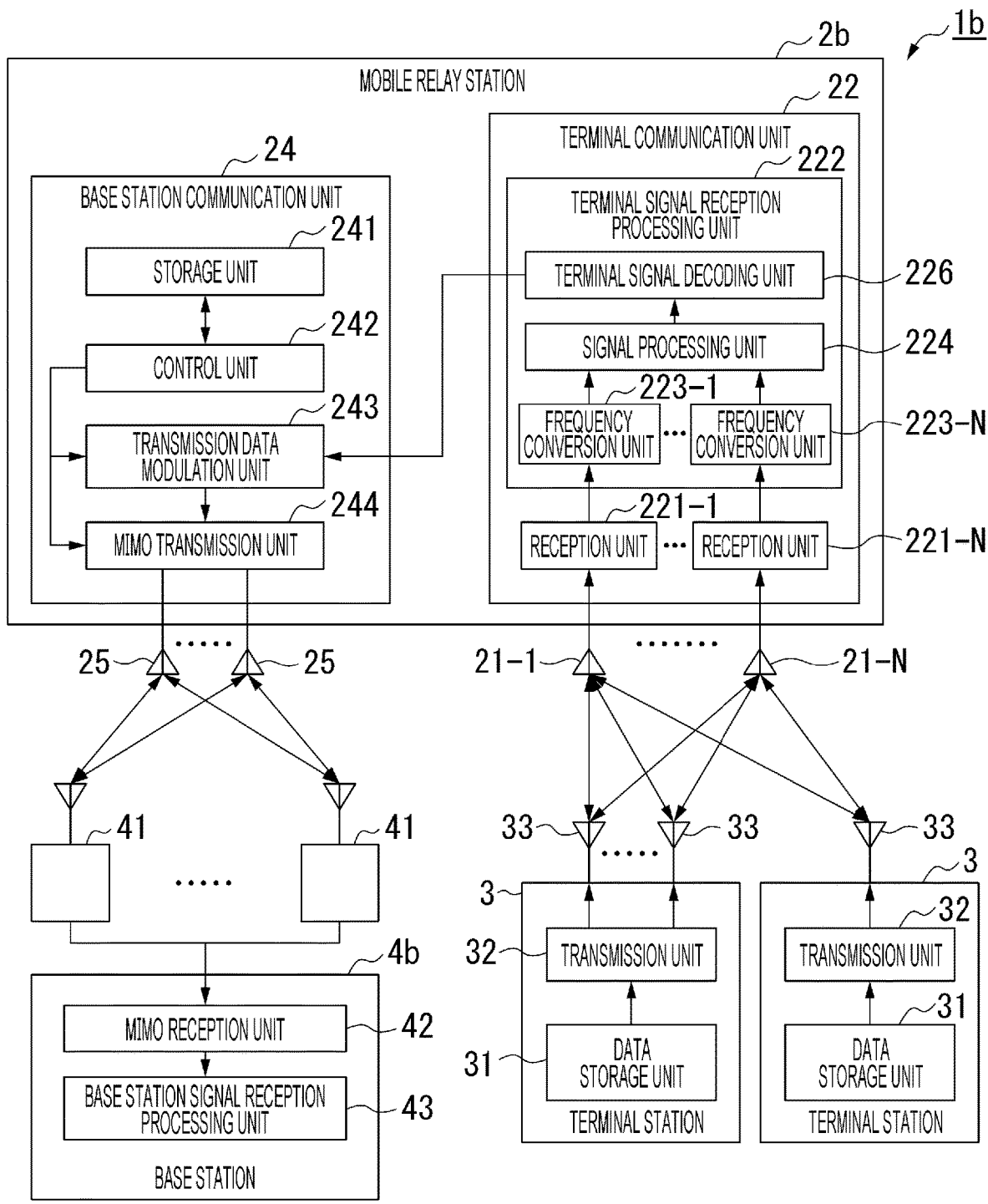
FIG. 7 is a diagram illustrating an exemplary configuration of a wireless communication system according to a second modification of the first embodiment.

FIG. 7 is a diagram illustrating an exemplary configuration of a wireless communication system 1b according to the second modification of the first embodiment. The terminal signal reception processing unit 222 includes N frequency conversion units 223, the signal processing unit 224, and a terminal signal decoding unit 226. The frequency conversion unit 223 converts the terminal uplink signal received by the reception unit 221-n into a baseband signal and outputs the baseband signal to the signal processing unit 224. The signal processing unit 224 combines baseband signals input from the frequency conversion units 223-1 to 223-N. The terminal signal decoding unit 226 performs a decoding process on combination information (symbol) that is a combination result of the baseband signals. The terminal signal decoding unit 226 outputs the decoding result to transmission data modulation unit 243.

The base station 4b includes the plurality of antenna stations 41, the MIMO reception unit 42, and the base station signal reception processing unit 43. The base station signal reception processing unit 43 acquires the received decoding result from the MIMO reception unit 42.

Third Modification of First Embodiment

In a third modification of the first embodiment, the mobile relay station accumulates waveform data of the terminal uplink signal and wirelessly transmits the base station downlink signal including the accumulated waveform data to the base station 4. The first modification of the first embodiment will be described focusing on differences from the first embodiment.

Figure 8:
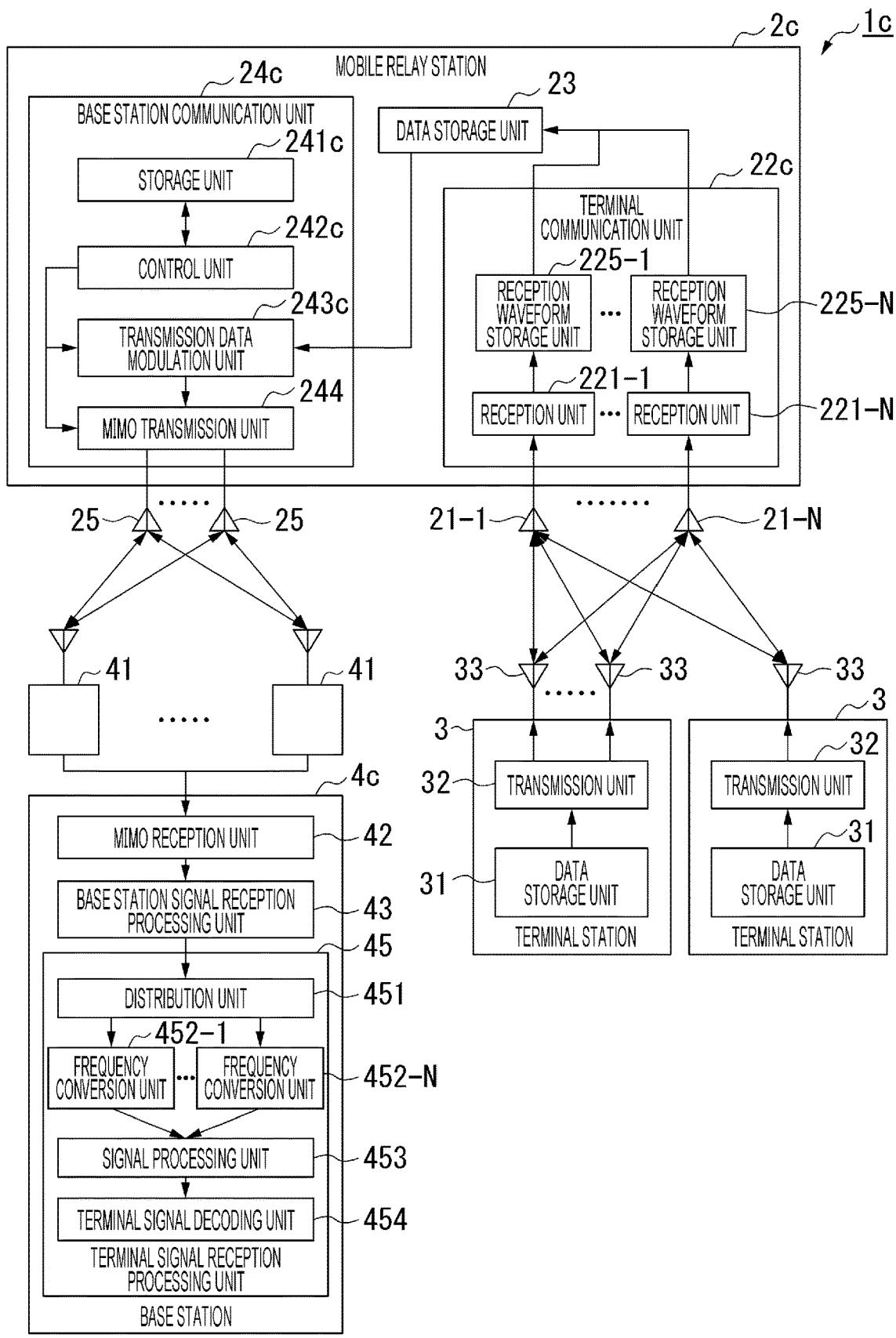
FIG. 8 is a diagram illustrating an exemplary configuration of a wireless communication system according to a third modification of the first embodiment.

FIG. 8 is a diagram illustrating an exemplary configuration of a wireless communication system 1c according to a first modification of the first embodiment. In the drawing, the same components as those of the wireless communication system 1 in the first embodiment illustrated in FIG. 1 are denoted by the same reference numerals, and description thereof will be omitted. The wireless communication system 1c includes a mobile relay station 2c, a terminal station 3, and a base station 4a.

The mobile relay station 2c mounted on an LEO satellite performs communication while moving at a high speed. Specifically, when the mobile relay station 2c is viewed from the ground, the mobile relay station 2c passes through the sky in about several minutes. Therefore, a time in which each terminal station 3 or the base station 4c can communicate with the mobile relay station 2c at high quality is limited, and the time may be different between the terminal station 3 and the base station 4c. In addition, any of wireless communication schemes of various specifications is used for the terminal station 3.

Accordingly, the mobile relay station 2c according to the first modification of the first embodiment receives a terminal uplink signal from the terminal station 3 within a coverage at a present position during movement and stores waveform data of the received terminal uplink signal. The mobile relay station 2c wirelessly transmits the base station downlink signal including the waveform data of the terminal uplink signal to the base station 4c at a timing at which there is the base station 4c in the coverage. The base station 4c obtains the waveform data of the terminal uplink signal by performing a frequency conversion process on the base station downlink signal received from the mobile relay station 2c. The base station 4c obtains terminal transmission data that is data transmitted by the terminal station 3 by decoding the waveform data.

A configuration of each device will be described.

The mobile relay station 2c includes N antennas 21 (where N is an integer equal to or greater than 2), a terminal communication unit 22c, a data storage unit 23, a base station communication unit 24c, and a plurality of antennas 25. The terminal communication unit 22c includes N reception units 221 and N reception waveform recording units 225. The N reception waveform recording units 225 are referred to as reception waveform recording units 225-1 to 225-N. The reception waveform recording unit 225-n (where n is an integer equal to or greater than 1 and equal to or less than N) samples the reception waveform of the terminal uplink signal received by the reception unit 221-n and generates waveform data indicating a value obtained by sampling. The reception waveform recording unit 225-n records the reception waveform information including the antenna identifier of the antenna 21-n, the reception time of the terminal uplink signal at the antenna 21-n, and the generated waveform data in the data storage unit 23. The antenna identifier is information for specifying the antenna 21-n. The data storage unit 23 stores the reception waveform information including the waveform data of the terminal uplink signal received by each of the antennas 21-1 to 21-N.

The base station communication unit 24c includes a storage unit 241c, a control unit 242c, a transmission data modulation unit 243c, and a MIMO transmission unit 244. The storage unit 241c stores a transmission start timing calculated in advance based on the orbit information of the LEO satellite on which the mobile relay station 2c is mounted and the position of the base station 4. The storage unit 241c stores a weight at each transmission time of the base station downlink signal transmitted from each antenna 25 in advance. A constant weight may be used regardless of the transmission time.

The control unit 242c controls the transmission data modulation unit 243c and the MIMO transmission unit 244 such that the reception waveform information is transmitted to the base station 4c at the transmission start timing stored in the storage unit 241c. Further, the control unit 242c gives an instruction for the weight for each transmission time read from the storage unit 241c to the MIMO transmission unit 244. The transmission data modulation unit 243c reads the reception waveform information from the data storage unit 23 as transmission data. The transmission data modulation unit 243c converts the read transmission data into a parallel signal and modulates the parallel signal. The transmission data modulation unit 243c outputs the modulated parallel signal to the MIMO transmission unit 244. The MIMO transmission unit 244 generates the base station downlink signal transmitted from each antenna 25 by weighting the parallel signal using the weight instructed from the control unit 242. The MIMO transmission unit 244 transmits the generated base station downlink signal from the antenna 25 by MIMO.

The base station 4c includes a plurality of antenna stations 41, a MIMO reception unit 42, a base station signal reception processing unit 43, and a terminal signal reception processing unit 45. The terminal signal reception processing unit 45 includes a distribution unit 451, a plurality of frequency conversion units 452, a signal processing unit 453, and a terminal signal decoding unit 454.

The terminal signal reception processing unit 45 acquires the reception waveform information received by the base station signal reception processing unit 43. The terminal signal reception processing unit 45 performs a reception process for the terminal uplink signal indicated by the reception waveform information. At this time, the terminal signal reception processing unit 45 performs the reception process in conformity with a wireless communication scheme used for transmission by the terminal station 3 and acquires terminal transmission data. The terminal signal reception processing unit 45 includes the distribution unit 451, the N frequency conversion units 452, the signal processing unit 453, and the terminal signal decoding unit 454. The N frequency conversion units 452 are denoted as frequency conversion units 452-1 to 452-N.

The distribution unit 451 reads the waveform data at the same reception time from the reception waveform information and outputs the read waveform data to the frequency conversion units 452-1 to 452-N in accordance with an antenna identifier associated with the waveform data. That is, the distribution unit 451 outputs the waveform data associated with the antenna identifier of the antenna 21-$n$ to the frequency conversion unit 452-$n$. Each of the frequency conversion units 452-1 to 452-N executes a frequency conversion process on the waveform data and outputs a symbol obtained by the frequency conversion process to the signal processing unit 453. The frequency conversion unit 452-$n$ may perform the frequency conversion process on the signal indicated by the waveform data after performing a process of compensating for the Doppler shift of the terminal uplink signal received by the antenna 21-$n$ of the mobile relay station 2. The Doppler shift received with the terminal uplink signal received by each antenna 21-$n$ is calculated in advance based on a position of the terminal station 3 and the orbit information of the LEO on which the mobile relay station 2$a$ is mounted. The signal processing unit 453 combines the symbols input from the frequency conversion units 452-1 to 452-N and outputs the combined symbol to the terminal signal decoding unit 454. The terminal signal decoding unit 454 decodes the combined symbol to obtain the terminal transmission data transmitted from terminal station 3.

An operation of the wireless communication system 1$c$ will be described.

Figure 9:
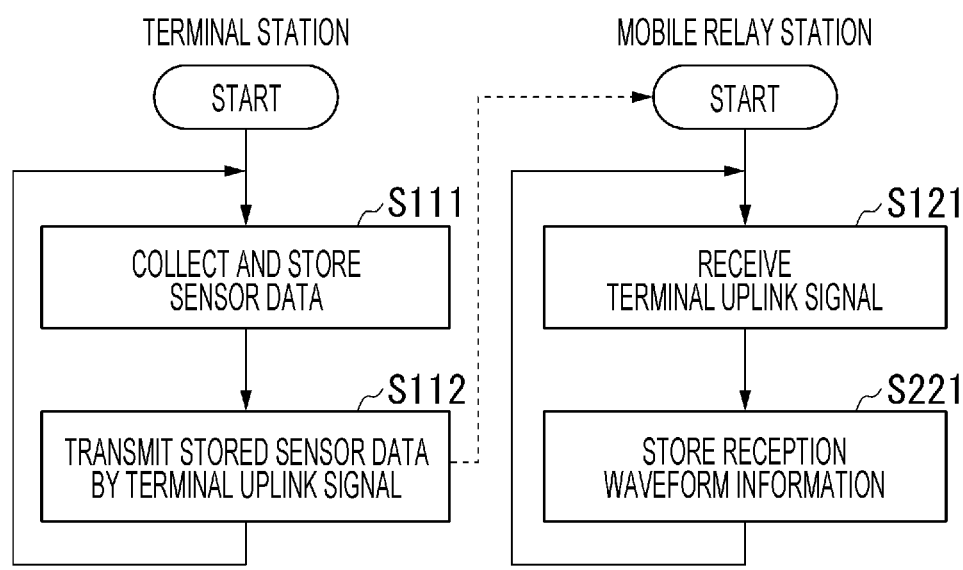
FIG. 9 is a flowchart illustrating a process of a wireless communication system according to a third modification of the first embodiment.

FIG. 9 is a flowchart illustrating a process of the wireless communication system 1$a$ when an uplink signal is transmitted from the terminal station 3. In the drawing, the same processes as those of the first embodiment illustrated in FIG. 4 are denoted by the same reference numerals. The terminal station 3 performs processes similar to the processes of steps S111 to S112 in the processing flow of the first embodiment illustrated in FIG. 4.

The reception units 221-1 to 221-N of the mobile relay station 2$c$ receive the terminal uplink signal transmitted from the terminal station 3 (step S121). The reception waveform recording unit 225-$n$ writes the reception waveform information in which the waveform data representing a waveform of the terminal uplink signal received by the reception unit 221-$n$, a reception time, and the antenna identifier of the antenna 21-$n$ are associated with each other in the data storage unit 23 (step S221). The mobile relay station 2$c$ repeats the process from step S121.

Figure 10:
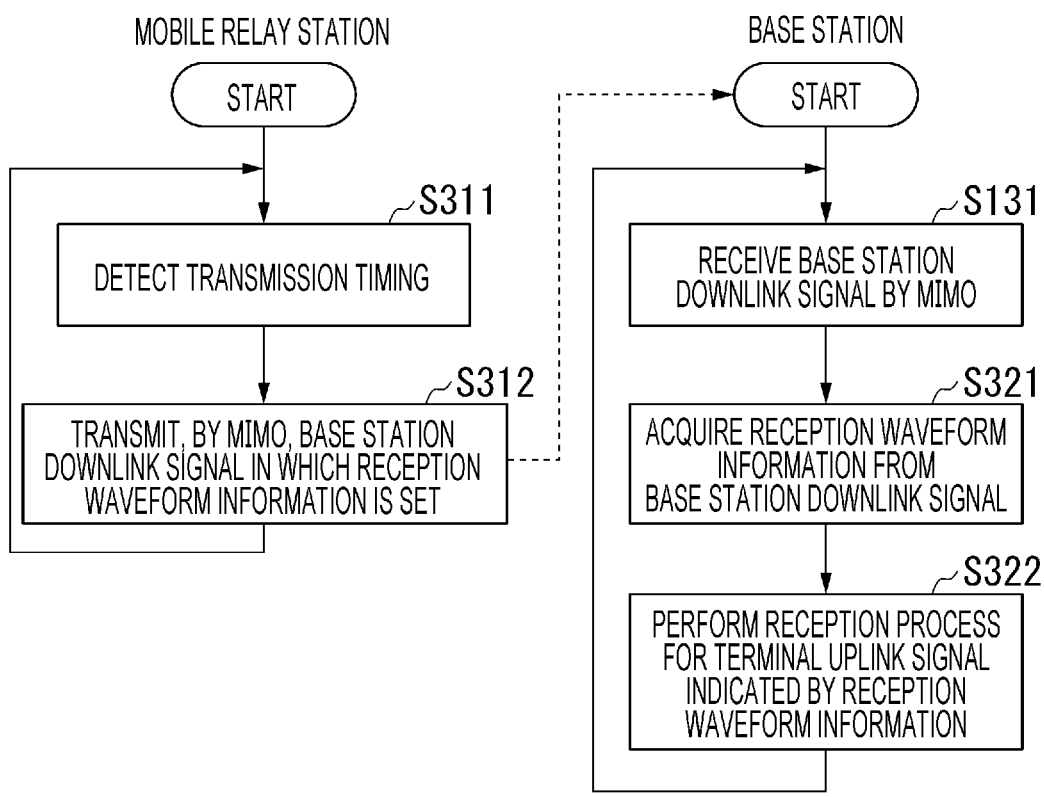
FIG. 10 is a flowchart illustrating a process of a wireless communication system according to a third modification of the first embodiment.

FIG. 10 is a flowchart illustrating a process of the wireless communication system 1$c$ when a base station downlink signal is transmitted from the mobile relay station 2$c$. In FIG. 10, the same processes as those illustrated in the flowchart of the first embodiment illustrated in FIG. 4 are denoted by the same reference numerals.

When the transmission start timing stored in the storage unit 241$c$ is detected, the control unit 242$c$ included in the base station communication unit 24$a$ of the mobile relay station 2$c$ instructs the transmission data modulation unit 243$c$ and the MIMO transmission unit 244 to transmit the reception waveform information (step S311). The transmission data modulation unit 243$c$ reads the reception waveform information accumulated in the data storage unit 23 as transmission data. The transmission data modulation unit 243$c$ converts the read transmission data into a parallel signal and modulates the parallel signal. The MIMO transmission unit 244 weights the transmission data modulated by the transmission data modulation unit 243$c$ in accordance with the weight instructed from the control unit 242$c$. Accordingly, the MIMO transmission unit 244 generates the base station downlink signal transmitted from each antenna 25. The MIMO transmission unit 244 transmits each generated base station downlink signal from the antenna 25 by MIMO (step S312). The mobile relay station 2 repeats the process from step S311.

Like the first embodiment illustrated in FIG. 4, the base station 4$c$ receives the base station downlink signal from the mobile relay station 2$c$ by MIMO (step S131). Specifically, each antenna station 41 converts the base station downlink signal received from the mobile relay station 2$c$ into an electrical signal and outputs the converted electrical signal to the MIMO reception unit 42 as a received signal. The MIMO reception unit 42 synchronizes timings of the received signals received from the antenna stations 41. The MIMO reception unit 42 multiplies the received signal received by each antenna station 41 by the weight and adds the received signal multiplied by the weight. The base station signal reception processing unit 43 receives the added received signal (step S321). The base station signal reception processing unit 43 outputs the reception waveform information obtained from the received signal to the terminal signal reception processing unit 45.

The terminal signal reception processing unit 45 performs a reception process for the terminal uplink signal indicated by the reception waveform information (step S322). Specifically, the distribution unit 451 reads the waveform data of which a reception time is the same from the reception waveform information and outputs the read waveform data to the frequency conversion units 452-1 to 452-N in accordance with the antenna identifier associated with the waveform data. The frequency conversion units 452-1 to 452-N specify a wireless communication scheme used by the terminal station 3 to transmit the terminal uplink signal based on information specific to the wireless communication scheme included in the received signal indicated by the waveform data. The frequency conversion units 452-1 to 452-N execute a frequency conversion process on the received signal indicated by the waveform data in accordance with the specified wireless communication scheme and output the obtained symbols to the signal processing unit 453.

The signal processing unit 453 performs frame detection, Doppler shift compensation, and offline beam control on the combined baseband signal. The offline beam control is not reception beam control performed by the mobile relay station but reception beam control performed by the base station as post-processing by transmitting recorded waveform data to the base station by the mobile relay station.

For example, the signal processing unit 453 combines baseband signals (symbols) input from the frequency conversion units 452-1 to 452-N. Since the signals transmitted by the terminal station 3 have correlation, the signals are enhanced by combination. Furthermore, an influence of noise randomly added to the signal is reduced by the combination. Therefore, the diversity effect can be obtained for the terminal uplink signal received by the mobile relay station 2$c$ from only one terminal station 3 at the same time. Combining the terminal uplink signals simultaneously received by the mobile relay station 2$c$ from the plurality of terminal stations 3 corresponds to performing MIMO communication. The signal processing unit 453 outputs the combined symbol to the terminal signal decoding unit 454. The terminal signal decoding unit 454 decodes the baseband signals (symbols) combined by the signal processing unit 453 in accordance with the specified wireless communication scheme. Accordingly, terminal signal decoding unit 454 obtains terminal transmission data transmitted from terminal station 3. The terminal signal decoding unit 454 can also use a decoding scheme in which a calculation load is large, such as SIC. The base station 4c repeats the process from step S131.

According to the third modification of the first embodiment, like the first embodiment, the mobile relay station receives the terminal uplink signal received from the terminal station by diversity reception, MIMO reception, or the like. Therefore, the link budget with the terminal station can be improved. The mobile relay station transmits the information regarding the reception waveform of the terminal uplink signal to the base station by MIMO. Accordingly, while the base station is included in the communicable area of the mobile relay station, the reception waveforms of the terminal uplinks received from many terminal stations until then can be collectively transmitted with high quality in volume.

As described above, in the third modification of the first embodiment, the mobile relay station 2c does not include the frequency conversion unit 223. The mobile relay station 2c stores and accumulates information regarding the received signal waveform without executing a frequency conversion process on the terminal uplink signal (RF signal) received from the terminal station 3 and performs MIMO transmission to the base station 4 at a communicable timing. The base station 4c performs a reception process such as signal processing and decoding on the terminal uplink signal represented by the received signal waveform in the mobile relay station 2. Therefore, a non-reproduction relay scheme that does not depend on a communication scheme can be applied to the wireless communication system 1 using a low earth orbiting satellite. Since non-reproduction relay is performed, the mobile relay station 2c is not required to implement a wireless communication scheme used for the terminal station 3. For example, even when the terminal station 3 that performs communication using a new wireless communication scheme is added, it is not necessary to perform change to the mobile relay station 2, and change may be performed such that the wireless communication scheme is added to the base station 4c installed on the ground. Accordingly, it is possible to simultaneously accommodate various IoT systems, and it is also possible to easily cope with updating of the IoT system. Since the large Doppler shift received by each terminal station 3 can be performed by the base station 4c without being processed by the mobile relay station 2c, it is not necessary to mount a complicated nonlinear operation of compensating for a Doppler shift in the mobile relay station 2c.

Fourth Modification of First Embodiment

A fourth modification of the first embodiment is different from the third modification of the first embodiment in that a mobile relay station includes a frequency conversion unit instead of a base station including a frequency conversion unit. The fourth modification of the first embodiment will be described focusing on differences from the third modification of the first embodiment.

Figure 11:
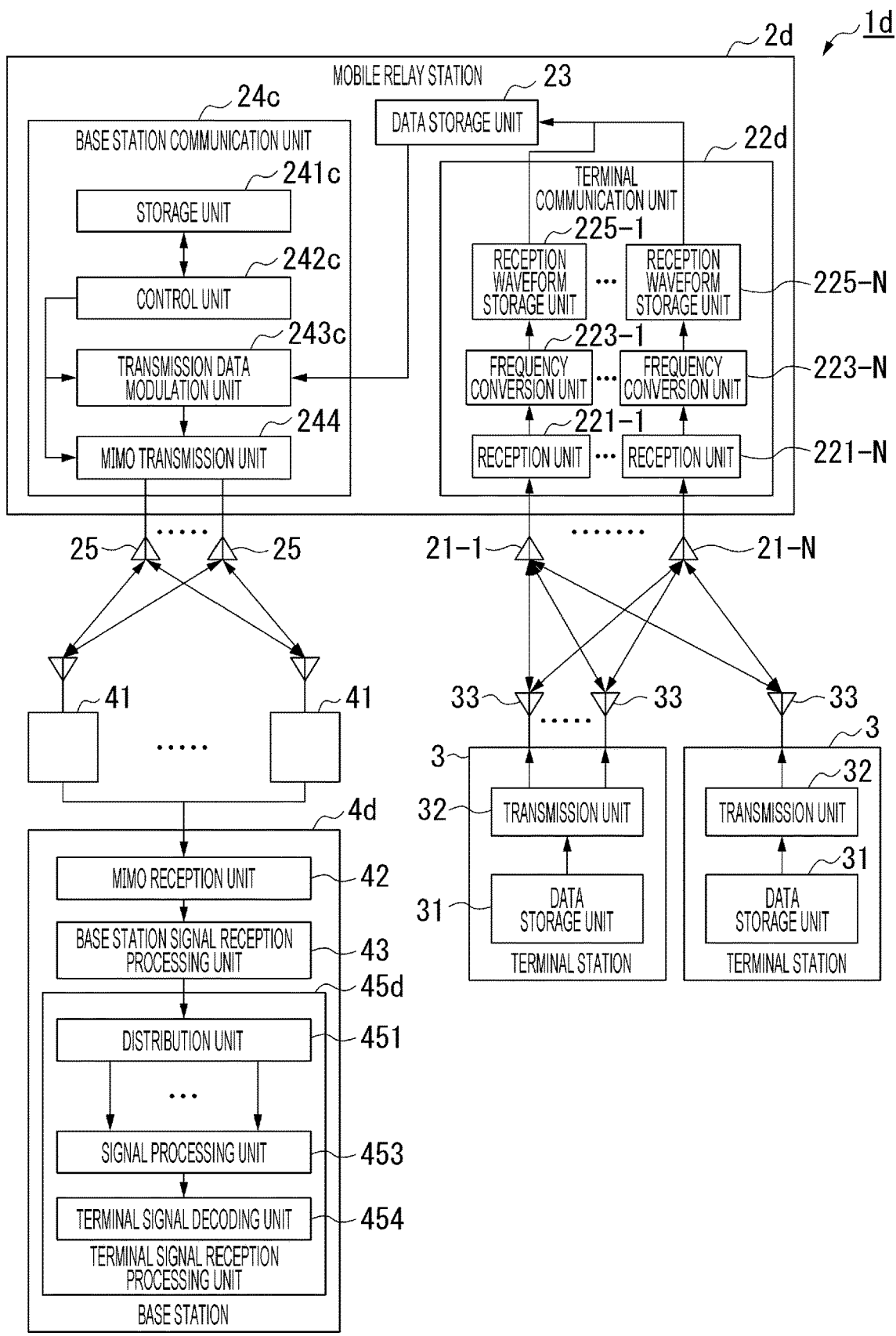
FIG. 11 is a diagram illustrating an exemplary configuration of a wireless communication system according to a fourth modification of the first embodiment.

FIG. 11 is a diagram illustrating an exemplary configuration of a wireless communication system 1d according to the fourth modification of the first embodiment. The mobile relay station 2d includes N antennas 21, a terminal communication unit 22d, a base station communication unit 24c, and a plurality of antennas 25. The terminal communication unit 22d includes N reception units 221, a terminal signal reception processing unit 222, and N frequency conversion units 223.

The frequency conversion unit 223-n (where n is an integer equal to or greater than 1 and equal to or less than N) converts a 920 MHz band RF signal received by the reception unit 221-n into a baseband signal using a quadrature demodulator or the like. The frequency conversion unit 223-n outputs the baseband signal to the reception waveform recording unit 225. The reception waveform recording unit 225-n (where n is an integer equal to or greater than 1 and equal to or less than N) samples the reception waveform of the terminal uplink signal received by the reception unit 221-n and generates waveform data indicating a value obtained by sampling.

The base station 4d includes a plurality of antenna stations 41, a MIMO reception unit 42, a base station signal reception processing unit 43, and a terminal signal reception processing unit 45d. The terminal signal reception processing unit 45d includes a distribution unit 451, a signal processing unit 453, and a terminal signal decoding unit 454.

The distribution unit 451 outputs the waveform data associated with the antenna identifier of the antenna 21-n to the signal processing unit 453. The signal processing unit 453 outputs the combined symbol to the terminal signal decoding unit 454. The terminal signal decoding unit 454 decodes the baseband signals (symbols) combined by the signal processing unit 453 in accordance with the specified wireless communication scheme. Accordingly, since not an RF signal with a high frequency but a baseband signal is sampled, an increase in a data amount of the waveform data can be inhibited.

Fifth Modification of First Embodiment

In the third modification of the above-described first embodiment described above, the base station performs frequency conversion and decoding on the terminal uplink signal. In a fifth modification of the first embodiment, a mobile relay station (relay device) performs frequency conversion and decoding on a terminal uplink signal. The fifth modification of the first embodiment will be described focusing on differences from the third modification of the first embodiment.

Figure 12:
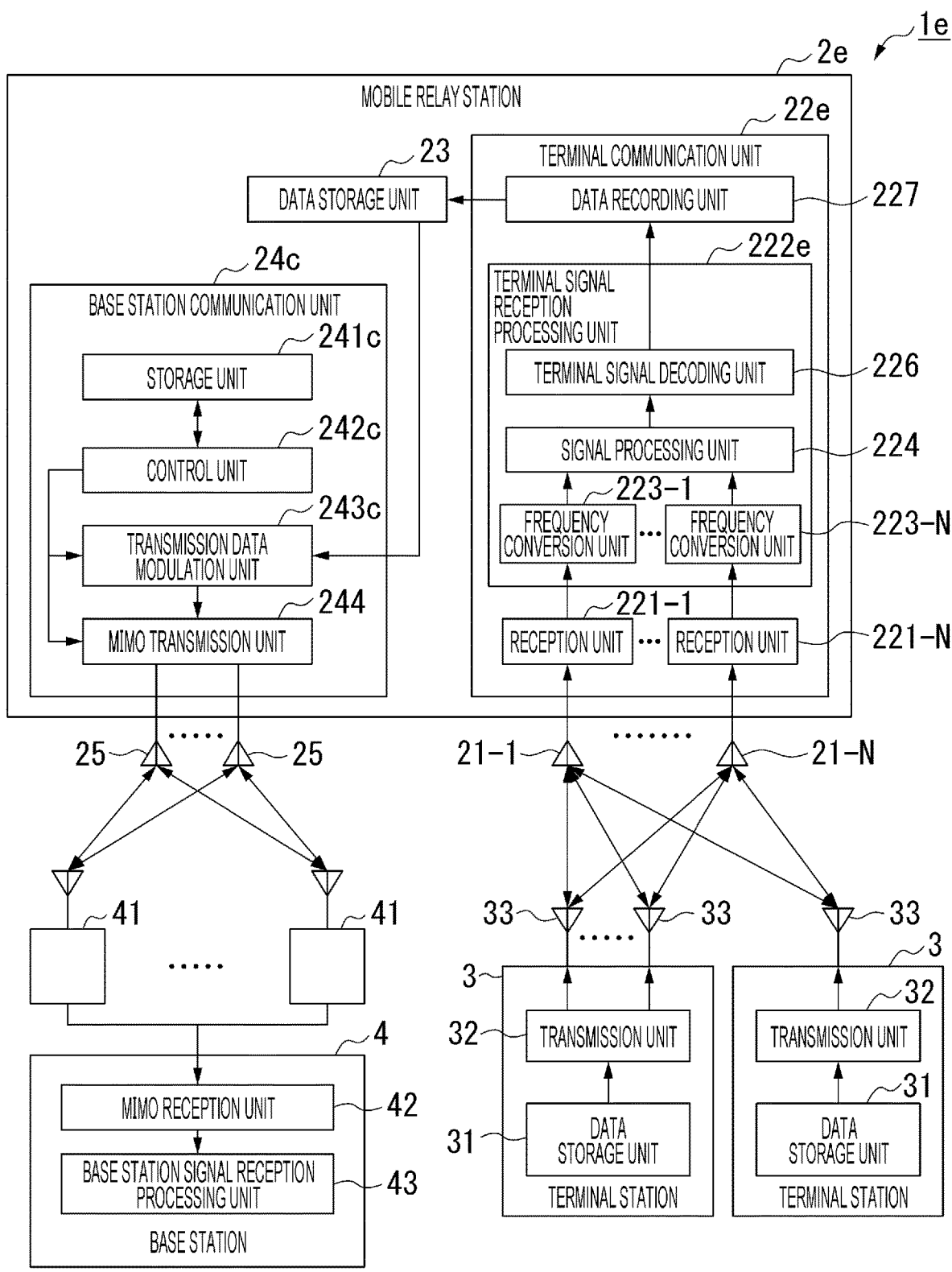
FIG. 12 is a diagram illustrating an exemplary configuration of a wireless communication system according to a fifth modification of the first embodiment.

FIG. 12 is a diagram illustrating an exemplary configuration of a wireless communication system 1e according to the fifth modification of the first embodiment. In the drawing, the same components as those of the wireless communication system 1 in the first modification of the third embodiment illustrated in FIG. 8 in the first embodiment illustrated in FIG. 1 are denoted by the same reference numerals, and description thereof will be omitted. The wireless communication system 1e includes a mobile relay station 2e, a terminal station 3, and a base station 4.

The mobile relay station 2e includes antennas 21-1 to 21-N (where N is an integer equal to or greater than 2), a terminal communication unit 22e, a data storage unit 23, a base station communication unit 24e, and a plurality of antennas 25.

The terminal communication unit 22e includes reception units 221-1 to 221-N, a terminal signal reception processing unit 222e, and a data recording unit 227.

The terminal signal reception processing unit 222e performs a reception process for the terminal uplink signal to obtain terminal transmission data. The terminal signal reception processing unit 222e includes N frequency conversion units 223, a signal processing unit 224, and a terminal signal decoding unit 226. The signal processing unit 224 combines the symbols input from the frequency conversion units 223-1 to 223-N and outputs the combined symbol to the terminal signal decoding unit 226. The terminal signal decoding unit 226 obtains the terminal transmission data transmitted from the terminal station 3 by decoding the symbols combined by the signal processing unit 224.

The data recording unit 227 writes the terminal transmission data decoded by the terminal signal decoding unit 226 on the data storage unit 23. The data storage unit 23 stores the terminal transmission data transmitted by each terminal station 3. The transmission data modulation unit 243c of the base station communication unit 24c reads the terminal transmission data from the data storage unit 23 as transmission data.

The base station 4 includes a plurality of antenna stations 41, a MIMO reception unit 42, and a base station signal reception processing unit 43. The base station signal reception processing unit 43 obtains the terminal transmission data by converting the received signals (RF signals) combined by the MIMO reception unit 42 into a baseband signal.

An operation of the wireless communication system 1b will be described.

Figure 13:
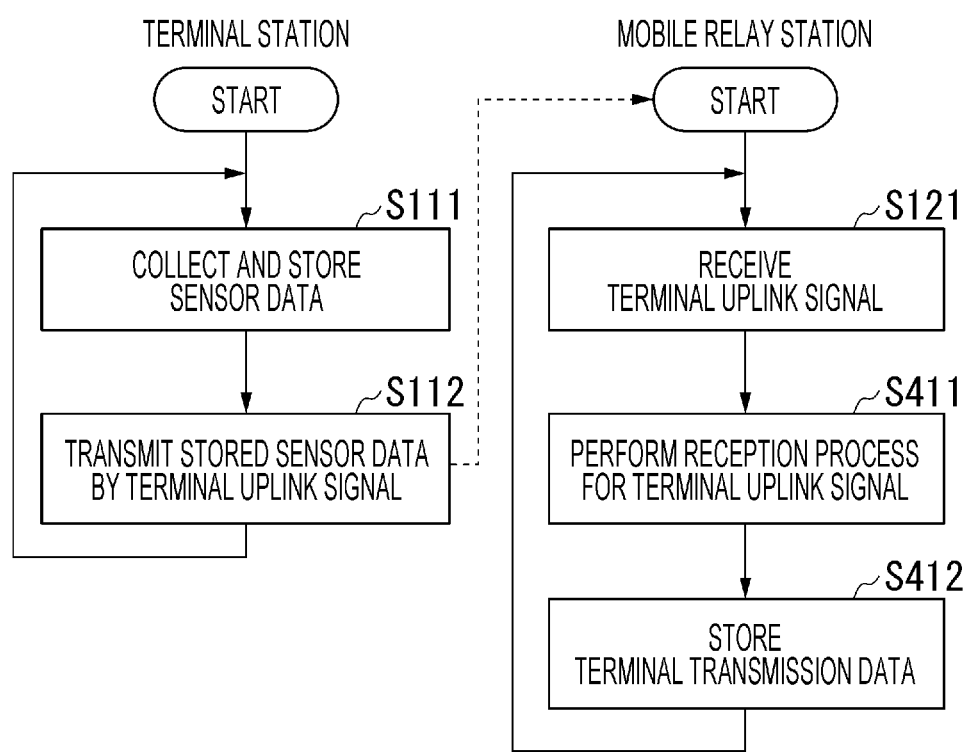
FIG. 13 is a flowchart illustrating a process of a wireless communication system according to a fifth modification of the first embodiment.

FIG. 13 is a flowchart illustrating a process of the wireless communication system 1b when an uplink signal is transmitted from the terminal station 3. In FIG. 13, the same processes as those illustrated in the flowchart of the first embodiment illustrated in FIG. 4 are denoted by the same reference numerals.

Processes of the terminal station 3 in steps S111 and S112 are similar to those of the first embodiment illustrated in FIG. 4. Like the first embodiment, the reception units 221-1 to 221-N of the mobile relay station 2b receive the terminal uplink signals transmitted from the terminal station 3 (step S121). The terminal signal reception processing unit 222e performs a reception process for the terminal uplink signal received in step S121 (step S411). Specifically, the frequency conversion unit 223-n specifies the wireless communication scheme based on the information specific to the wireless communication scheme included in the terminal uplink signal received by the reception unit 221-n. The reception units 221-1 to 221-N perform a frequency conversion process on the terminal uplink signal in conformity with the specified wireless communication scheme. The reception units 221-1 to 221-N output the obtained symbols to the signal processing unit 224. The signal processing unit 224 combines symbols input from the frequency conversion units 223-1 to 223-N. The signal processing unit 224 outputs the combined symbol to the terminal signal decoding unit 226. The terminal signal decoding unit 226 obtains the terminal transmission data transmitted from terminal station 3 by decoding the combined symbol. The data recording unit 227 writes the terminal transmission data obtained by the terminal signal decoding unit 226 decoding the symbols in the data storage unit 23 (step S412).

Figure 14:
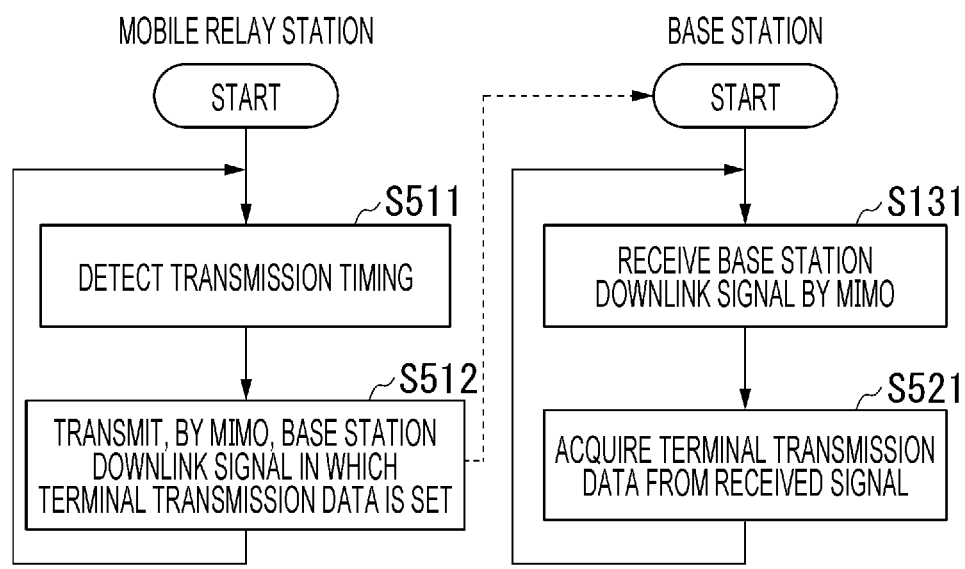
FIG. 14 is a flowchart illustrating a process of a wireless communication system according to a fifth modification of the first embodiment.

FIG. 14 is a flowchart illustrating a process of the wireless communication system 1e when a base station downlink signal is transmitted from the mobile relay station 2e. In FIG. 14, the same processes as those illustrated in the flowchart of the first embodiment illustrated in FIG. 4 are denoted by the same reference numerals.

When the transmission start timing stored in the storage unit 241c is detected, the control unit 242c included in the base station communication unit 24c of the mobile relay station 2e instructs the transmission data modulation unit 243c and the MIMO transmission unit 244 to transmit the terminal transmission data (step S511). The transmission data modulation unit 243c reads the terminal transmission data accumulated in the data storage unit 23 as transmission data. The transmission data modulation unit 243c converts the read transmission data into a parallel signal and performs a modulation process on the parallel signal. The MIMO transmission unit 244 weights the transmission data modulated by the transmission data modulation unit 243c in accordance with the weight instructed from the control unit 242c. Accordingly, the MIMO transmission unit 244 generates a base station downlink signal which is a transmission signal transmitted from each antenna 25. The MIMO transmission unit 244 transmits each generated base station downlink signal from the antenna 25 by MIMO (step S512). The mobile relay station 2e repeats the process from step S511.

Like the first embodiment, the base station 4 receives the base station downlink signal from the mobile relay station 2e by MIMO (step S131). Specifically, each antenna station 41 converts a base station downlink signal received from the mobile relay station 2e into an electrical signal. Each antenna station 41 outputs the converted electric signal as a received signal to the MIMO reception unit 42. The MIMO reception unit 42 synchronizes timings of the received signals received from the antenna stations 41. The MIMO reception unit 42 multiplies the received signal received by each antenna station 41 by the weight and adds the multiplication results. The base station signal reception processing unit 43 obtains terminal transmission data by performing a frequency conversion process on the added received signal (step S521). The base station 4 repeats the process from step S131.

According to the above-described embodiment, the mobile relay station can receive the terminal uplink signal transmitted by the terminal station by diversity reception, MIMO reception, or the like. Accordingly, a link budget of the uplink signal from the terminal station can be improved. The mobile relay station performs MIMO transmission of the data received from the terminal station to the base station using a plurality of antennas. Accordingly, the data collected from the plurality of terminal stations can be collectively transmitted with high quality in a short time. Even when a communicable area moves with movement of a relay device, data received from a communication device can be relayed to another communication device.

Second Embodiment

In the first embodiment, the switching control unit switches the output destination of the analog signal based on the signal level measured in advance (the history information of the signal level). On the other hand, in a second embodiment, while the measurement unit measures the signal level of the received radio signal, the switching control unit switches an output destination of an analog signal. The switching control unit may not refer to the history information of the signal level. The second embodiment will be described focusing on differences from the first embodiment.

Figure 15:
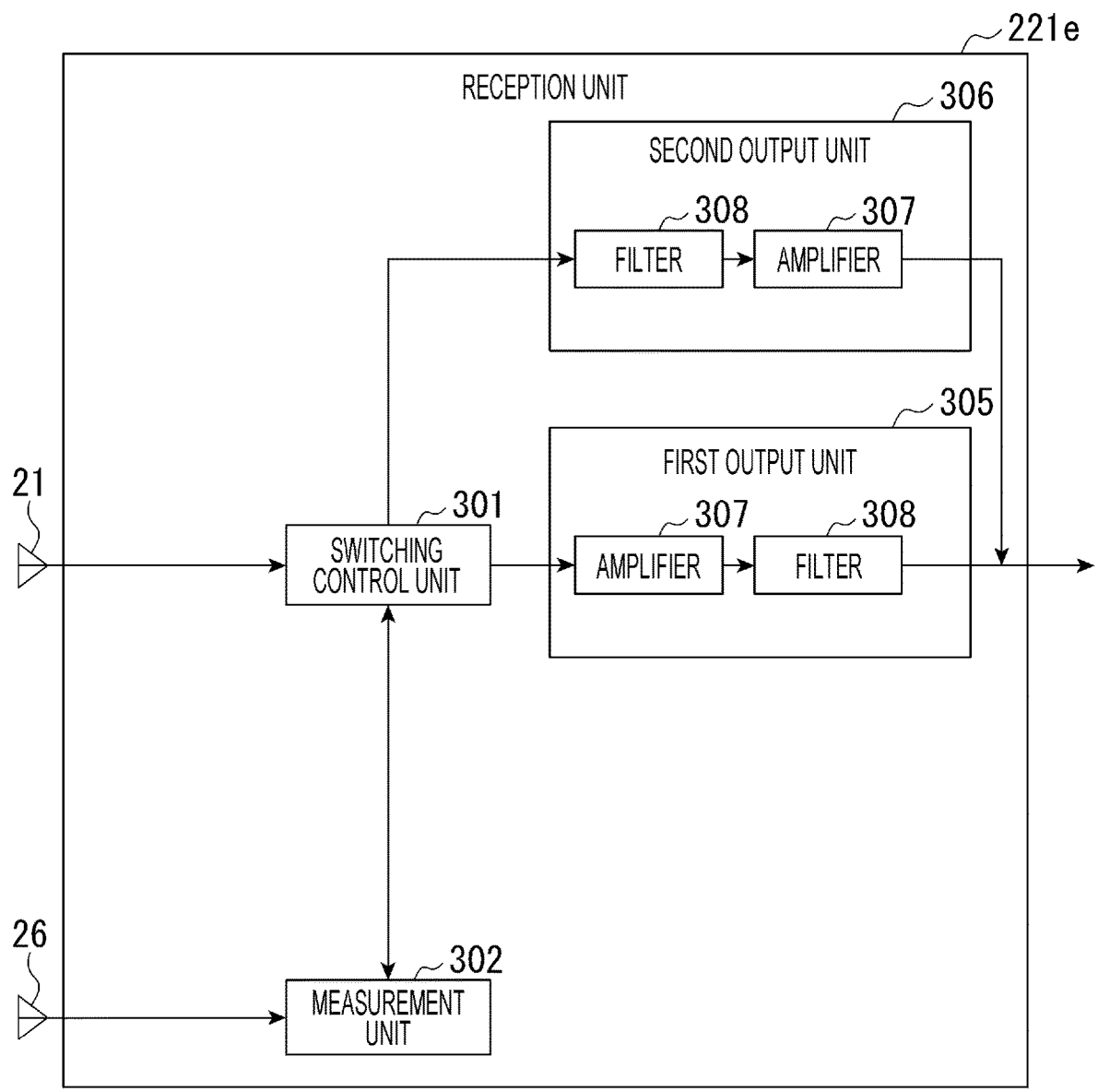
FIG. 15 is a diagram illustrating an exemplary configuration of a reception unit according to a second embodiment.

FIG. 15 is a diagram illustrating an exemplary configuration of a reception unit 221e according to the second embodiment. The reception unit 221e is provided in the mobile relay station 2, for example, like the reception unit 221 illustrated in FIG. 1. The reception unit 221a includes a switching control unit 301, a measurement unit 302, a first output unit 305, and a second output unit 306. The measurement unit 302 includes an antenna 26.

The measurement unit 302 constantly measures the interference state (occurrence situation) of the unnecessary wave using the antenna 26. A band in which the antenna 26 has a gain is wider than, for example, a band in which the antenna 21 has a gain.

When a radio signal (unnecessary wave) other than a desired frequency band does not currently interfere with a weak terminal uplink signal with the desired frequency band (when the signal level of the unnecessary wave is less than a given value), the switching control unit 301 inputs an analog signal corresponding to the received radio signal to the first output unit 305. That is, when the signal level of the radio signal at the present position of the mobile relay station 2 is less than the threshold, the switching control unit 301 inputs an analog signal corresponding to the received radio signal to the first output unit 305.

When a radio signal (unnecessary wave) other than the desired frequency band currently interferes with the weak terminal uplink signal with the desired frequency band, the switching control unit 301 inputs an analog signal corresponding to the received radio signal to the second output unit 306. That is, when the signal level of the radio signal at the present position of the mobile relay station 2 is equal to or higher than the threshold, the switching control unit 301 inputs an analog signal corresponding to the received radio signal to the second output unit 306.

Figure 16:
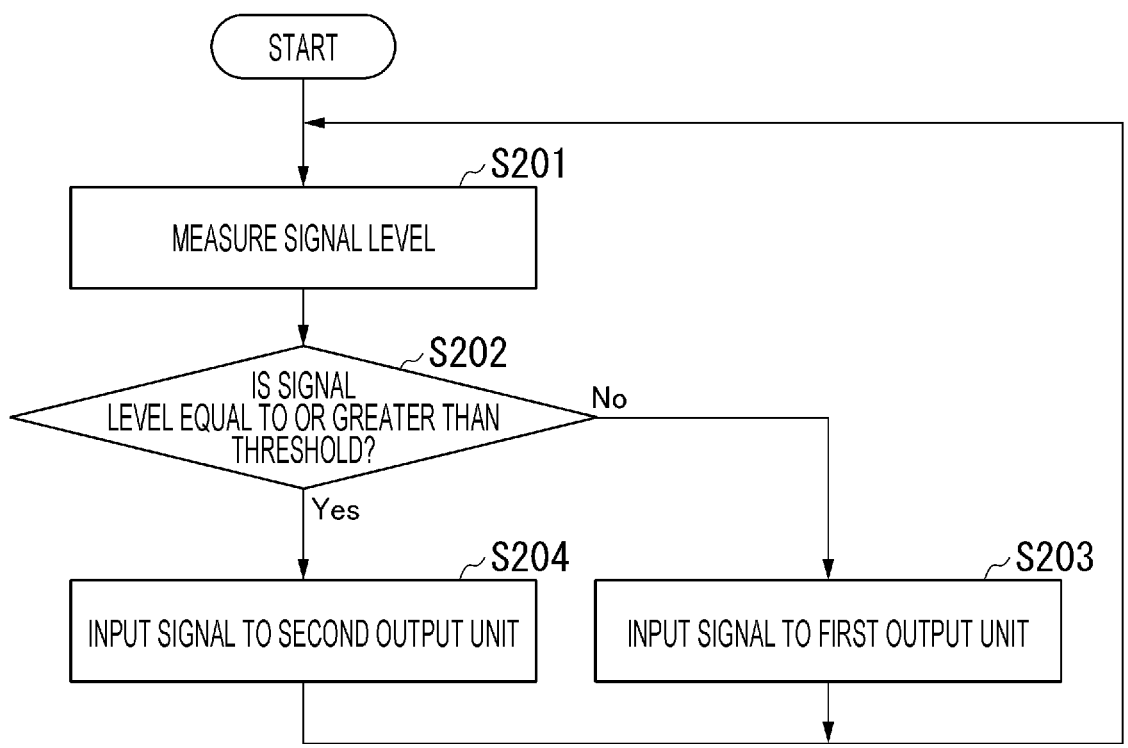
FIG. 16 is a flowchart illustrating an exemplary operation of a reception unit according to the second embodiment.

FIG. 16 is a flowchart illustrating an exemplary operation of the reception unit 221 according to the second embodiment. FIG. 16 is a flowchart illustrating an exemplary operation of the reception unit 221. While the mobile relay station 2 is orbing the earth, the measurement unit 302 measures a signal level of a radio signal with a predetermined band in which the antenna 26 has a gain. That is, the measurement unit 302 constantly measures the signal level of the analog signal corresponding to the radio signal (step S201). The switching control unit 301 determines whether the signal level of the analog signal corresponding to the received radio signal is equal to or higher than a threshold (step S202).

When the signal level is less than the threshold (step S202: No), the switching control unit 301 inputs the analog signal corresponding to the received radio signal to the first output unit 305 (step S203). When the signal level is equal to or higher than the threshold (step S202: Yes), the switching control unit 301 inputs an analog signal corresponding to the received radio signal to the second output unit 306 (step S204).

As described above, each antenna 21 receives the first radio signal with the predetermined band including the desired frequency band associated with the terminal station 3 (first communication device). The switching control unit 301 generates an analog signal corresponding to the received first radio signal. The measurement unit 302 measures the signal level of the analog signal with the predetermined band using the antenna 26. As a result, the measurement unit 302 can constantly measure the signal level over a wide band.

When the signal level of the analog signal (the analog signal of the unnecessary wave) other than the desired frequency band in the predetermined band is less than the threshold, the switching control unit 301 inputs the analog signal corresponding to the received first radio signal to the first output unit 305. When the signal level of the analog signal other than the desired frequency band in the predetermined band is equal to or greater than the threshold, the switching control unit 301 inputs the analog signal corresponding to the received first radio signal to the second output unit 306. Accordingly, it is possible to inhibit a decrease in the reception sensitivity of the radio signal.

In the foregoing embodiments, the case where the mobile object on which the mobile relay station is mounted is an LEO satellite has been described. However, the mobile object may be another flight object flying in the air, such as a stationary satellite, a drone, or an HAPS.

According to the above-described embodiments, the base station and the mobile relay station perform communication by MIMO, but the present invention is not limited thereto. At least one of the base station and the mobile relay station may perform communication using one antenna.

According to the above-described embodiments, the wireless communication system includes the first communication device, the second communication device, and the mobile relay device. For example, the first communication device is the terminal station 3 in the embodiments, the second communication device is the base station 4, 4c, or 4d in the embodiment, and the relay device is the mobile relay station 2, 2a, 2b, 2c, 2d, or 2e in the embodiments.

The relay device includes a reception unit and a transmission unit. For example, the reception unit is the terminal communication units 22, 22a, 22b, 22c, and 22d in the embodiments, and the transmission unit is the base station communication units 24 and 24a in the embodiments. The reception unit receives data wirelessly transmitted by the first communication device through a plurality of first antennas. For example, the first antenna is the antenna 21 in the embodiments. The first antenna may receive an unnecessary radio signal in a frequency band other than the desired frequency band. The reception unit may receive data wirelessly transmitted by the first communication device through a plurality of second antennas. For example, the second antenna is the antenna 26 in the embodiments. The second antenna may receive an unnecessary radio signal with a frequency band other than the desired frequency band.

The transmission unit wirelessly transmits the data received by the reception unit from the plurality of third antennas to the second communication device. For example, the third antenna is the antenna 25 in the embodiment. The second communication device includes a relay data reception unit. The relay data reception unit receives data wirelessly transmitted by the relay device via a plurality of fourth antennas. The fourth antenna is the antenna station 41 in the embodiments.

The relay device may further include a storage unit that stores data received by the reception unit. The storage unit is the data storage unit 23 in the embodiments. The transmission unit wirelessly transmits the data stored in the storage unit from the third antenna at a timing at which communication with the second communication device is possible.

Figure 17:
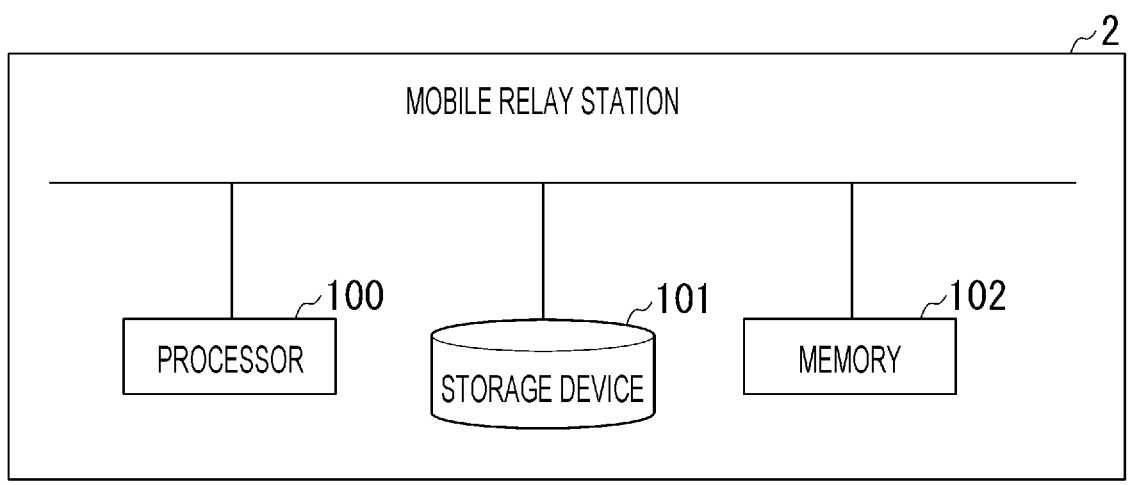
FIG. 17 is a diagram illustrating an exemplary hardware configuration of a mobile relay station according to each embodiment.

FIG. 17 is a diagram illustrating an exemplary hardware configuration of a functional unit of the mobile relay station 2 according to each embodiment. Parts of the mobile relay station, the terminal station, and the base station in each of the above-described embodiments may be implemented by a computer. In that case, a program for implementing these functions may be recorded on a computer-readable recording medium, and the program recorded on the recording medium may be read and executed by a computer system to implement the functions. The "computer system" mentioned herein includes hardware such as an OS and peripheral devices. The "computer-readable recording medium" is a portable medium such as a flexible disk, a magneto-optical disc, a read-only memory (ROM), or a compact disc read-only memory (CD-ROM), or a storage device such as a hard disk built in a computer system. Further, the "computer-readable recording medium" may include a medium that dynamically holds a program for a short time, such as a communication line when the program is transmitted via a network such as the Internet or a communication line such as a telephone line, and a medium that holds a program for a certain period of time, such as a volatile memory inside a computer system serving as a server or a client in that case. The foregoing program may be a program for implementing some of the above-described functions, may be a program implemented in a combination of the above-described functions and a program already recorded in a computer system, or may be a program implemented with a programmable logic device such as a field programmable gate array (FPGA).

That is, some or all of the functional units of the wireless communication system are implemented as software by the processor 100 such as a central processing unit (CPU) executing a program stored in the memory 102 including a nonvolatile recording medium (non-transitory recording medium). The program may be recorded on a computer-readable recording medium. The computer-readable recording medium is, for example, a portable medium such as a flexible disk, a magneto-optical disc, a read-only memory (ROM), or a compact disc read only memory (CD-ROM), or a non-transitory recording medium such as a storage device 101 such as a hard disk built in a computer system. Some or all of the functional units of the wireless communication system may be implemented by using, for example, hardware including an electronic circuit (electronic circuit or circuitry) using a large scale integrated circuit (LSI), an application specific integrated circuit (ASIC), a programmable logic device (PLD), an FPGA, or the like.

Although the embodiment of this invention has been described in detail with reference to the drawings, specific configurations are not limited to this embodiment and include design and the like within a range without departing from the gist of this invention.

REFERENCE SIGNS LIST 1, 1a, 1b, 1c, 1d, 1e Wireless communication system
2, 2a, 2b, 2c, 2d, 2e Mobile relay station
3 Terminal station
4, 4b, 4c, 4d Base station
21-1 to 21-N Antenna
22, 22a, 22b, 22c, 22d Terminal communication unit
23 Data storage unit
24, 24a, 24c Base station communication unit
25 Antenna
26 Antenna
31 Data storage unit
32 Transmission unit
33 Antenna
41 Antenna station
42 MIMO reception unit
43 Base station signal reception processing unit
44, 45, 222, 222b, 222e Terminal signal reception processing unit
221-1 to 221-N Reception unit
223-1 to 223-N, 452-1 to 452-N Frequency conversion unit
224, 453 Signal processing unit
225-1 to 225-N Reception waveform recording unit
226, 441, 454 Terminal signal decoding unit
227 Data storage unit
241, 241a Storage unit
242, 242a Control unit
243, 243a Transmission data modulation unit
244 MIMO transmission unit
301 Switching control unit
302 Measurement unit
303 Position detection unit
304 Storage unit
305 First output unit
306 Second output unit
307 Amplifier
308 Filter
309 converter
400 Unnecessary wave
451 Distribution unit

The invention claimed is:

1. A wireless communication system comprising:
a first communication device;
a second communication device;
a mobile relay device;
an antenna configured to receive a first radio signal with a predetermined band including a desired frequency band associated with the first communication device;
a measurer configured to measure a signal level of an analog signal corresponding to the received first radio signal in the predetermined band;
a first outputter configured to amplify an amplitude of the input analog signal and extract the analog signal with the desired frequency band from the analog signal with the amplified amplitude when the analog signal corresponding to the received first radio signal is input;
a second outputter configured to extract the analog signal with the desired frequency band from the input analog signal and amplify the amplitude of the extracted analog signal when the analog signal corresponding to the received first radio signal is input;
a position detector configured to detect a position of the mobile relay device;
a storage configured to store the signal level of the analog signal in the predetermined band as history information in association with the position of the mobile relay device; and
a switching controller configured to
input the analog signal corresponding to the received first radio signal to the first outputter when the present position of the mobile relay device is the same as the position of the mobile relay device in the history information and the signal level associated with the position of the mobile relay device in the history information is less than a threshold, and
input the analog signal corresponding to the received first radio signal to the second outputter when the present position of the mobile relay device is the same as the position of the mobile relay device in the history information and the signal level associated with the position of the mobile relay device in the history information is equal to or greater than the threshold; and
a transmitter configured to transmit a second radio signal corresponding to the analog signal extracted by the first outputter or a third radio signal corresponding to the analog signal with the amplitude amplified by the second outputter to the second communication device.

2. A mobile relay device comprising:
an antenna configured to receive a radio signal with a predetermined band including a desired frequency band associated with a communication device;

a measurer configured to measure a signal level of an analog signal corresponding to the received radio signal in the predetermined band;

a first outputter configured to amplify an amplitude of the input analog signal and extract the analog signal with the desired frequency band from the analog signal with the amplified amplitude when the analog signal corresponding to the received radio signal is input;

a second outputter configured to extract the analog signal with the desired frequency band from the input analog signal and amplify an amplitude of the extracted analog signal when the analog signal corresponding to the received radio signal is input;

a position detector configured to detect a position of the mobile relay device;

a storage configured to store the signal level of the analog signal in the predetermined band as history information in association with a position of the mobile relay device; and a switching controller configured to
input the analog signal corresponding to the received radio signal to the first outputter when the present position of the mobile relay device is the same as the position of the mobile relay device in the history information and the signal level associated with the position of the mobile relay device in the history information is less than a threshold, and input the analog signal corresponding to the received radio signal to the second outputter when the present position of the mobile relay device is the same as the position of the mobile relay device in the history information and the signal level associated with the position of the mobile relay device in the history information is equal to or greater than the threshold.

3. A wireless communication method executed by a wireless communication system including a first communication device, a second communication device, and a mobile relay device, the method comprising:

receiving, by an antenna, a first radio signal with a predetermined band including a desired frequency band associated with the first communication device;

measuring a signal level of an analog signal corresponding to the received first radio signal in the predetermined band;

performing, by a first outputter of the mobile relay device, a first output of amplifying an amplitude of the input analog signal and extracting the analog signal with the desired frequency band from the analog signal with the amplified amplitude when the analog signal corresponding to the received first radio signal is input;

performing, by a second outputter of the mobile relay device, a second output of extracting the analog signal with the desired frequency band from the input analog signal and amplifying the amplitude of the extracted analog signal when the analog signal corresponding to the received first radio signal is input;

detecting a position of the mobile relay device;

recording the signal level of the analog signal in the predetermined band as history information on a storage in association with the position of the mobile relay device;

inputting the analog signal corresponding to the received first radio signal to the first outputter when the present position of the mobile relay device is the same as the position of the mobile relay device in the history information and the signal level associated with the position of the mobile relay device in the history information is less than a threshold;

inputting the analog signal corresponding to the received first radio signal to the second outputter when the present position of the mobile relay device is the same as the position of the mobile relay device in the history information and the signal level associated with the position of the mobile relay device in the history information is equal to or greater than the threshold; and transmitting a second radio signal corresponding to the analog signal extracted by the first outputter or a third radio signal corresponding to the analog signal with the amplitude amplified by the second outputter to the second communication device.

* * * * *